US010685664B1

(12) United States Patent
Kristjansson et al.

(10) Patent No.: US 10,685,664 B1
(45) Date of Patent: Jun. 16, 2020

(54) ANALYZING NOISE LEVELS TO DETERMINE USABILITY OF MICROPHONES

(71) Applicant: Amazon Technologies, Inc., Seattle, WA (US)

(72) Inventors: Trausti Thor Kristjansson, San Jose, CA (US); Balaji Nagendran Thoshkahna, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/173,614

(22) Filed: Oct. 29, 2018

(51) Int. Cl.
*G10L 15/22* (2006.01)
*G10L 21/0208* (2013.01)
*G10L 21/0224* (2013.01)
*H04R 3/00* (2006.01)
*G06F 3/16* (2006.01)
*G10L 21/0216* (2013.01)

(52) U.S. Cl.
CPC .......... *G10L 21/0224* (2013.01); *G06F 3/167* (2013.01); *H04R 3/005* (2013.01); *G10L 2021/02166* (2013.01); *H04R 2499/13* (2013.01)

(58) Field of Classification Search
CPC ..... G10L 21/0224; G10L 15/20; G10L 15/22; G10L 21/0208; G06F 3/167; H04R 2499/13; H04R 3/005

USPC .......................................... 381/122, 56, 58
See application file for complete search history.

(56) References Cited

U.S. PATENT DOCUMENTS

| 2008/0226098 | A1* | 9/2008 | Haulick | G10L 21/0208 381/94.9 |
| 2010/0057465 | A1* | 3/2010 | Kirsch | G01C 21/3629 704/260 |
| 2014/0362999 | A1* | 12/2014 | Scheper | G08B 21/182 381/56 |
| 2015/0304786 | A1* | 10/2015 | Partio | H04R 25/305 381/58 |
| 2018/0350355 | A1* | 12/2018 | Amman | G10L 15/22 |

* cited by examiner

*Primary Examiner* — Vivian C Chin
*Assistant Examiner* — Ubachukwu A Odunukwe
(74) *Attorney, Agent, or Firm* — Lee & Hayes, P.C.

(57) ABSTRACT

This disclosure describes, in part, techniques for detecting that a microphone of a voice-enabled device is unusable due to noise levels around the microphone, and indicating to a user that the device has become unusable due to, for example, buffeting. The device may analyze audio signals to determine that the noise levels are too high to perform speech-processing techniques to detect voice. The device may utilize speakers to output sounds, and/or LEDs to output light, to indicate noise levels and/or that the device is unable to detect voice due to buffeting. In this way, the device may indicate that a user needs to speak loudly to be heard, move their device, and/or reduce sound in the environment to use the speech-processing abilities of the device.

19 Claims, 8 Drawing Sheets

ANALYZING NOISE LEVELS TO DETERMINE USABILITY OF MICROPHONES

BACKGROUND

As the capabilities of computing devices continue to evolve, many different ways have been introduced to allow users to interact with computing devices, such as through mechanical devices (e.g., keyboards, mice, etc.), touch screens, motion, and gesture. Many computing devices are now capable of receiving and responding to voice commands, including desktops, tablets, entertainment systems, and portable communication devices. Due to their usefulness, voice-enabled devices continue to proliferate. For instance, voice-enabled devices continue to be used in various environments, such as households, to help with everyday activities. However, as voice-enabled devices are introduced into new environments, difficulties often arise when attempting to utilize these voice-enabled devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
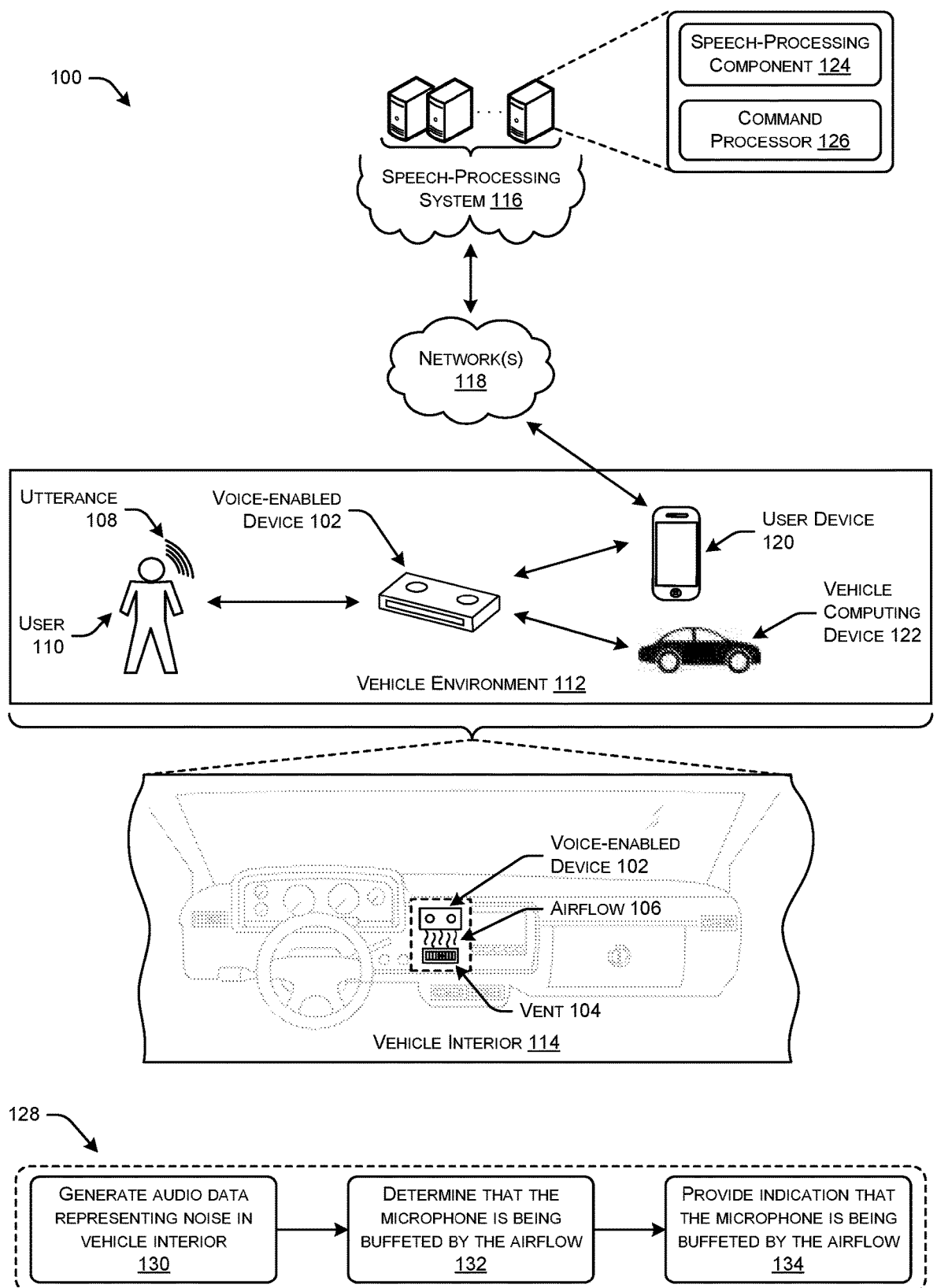
FIG. 1 illustrates a schematic diagram of an example environment in which a voice-enabled device is positioned near an air vent such that airflow is buffeting a microphone of the voice-enabled device thereby preventing the voice-enabled device from detecting an utterance of a user.

With the proliferation of voice-enabled computing devices, or "voice-enabled devices," users are able to interact with more of their computing devices through speech. For instance, a user may issue a command via a speech utterance to a voice-enabled device to perform an operation, such as turning on/off an appliance, streaming music, performing a telephone call, etc. Due to the usefulness of these voice-enabled devices, it is desirable to have voice-enabled devices available for use different environments, particularly in environments in which users traditionally have been unable to interact with computing devices using speech. Voice-enabled devices continue to be implemented in certain environments, such as households and vehicles, but various issues may arise as voice-enabled devices are introduced and integrated into new environments.

This disclosure describes, at least in part, techniques for detecting that a microphone of a voice-enabled device is unusable due to noise levels in the environment around the microphone, and indicating that the device has become unusable to a user of the device. The voice-enabled devices may analyze audio signals generated by one or more microphones to determine noise levels in the environments of the devices, and determine whether the noise levels are too high as to perform speech-processing techniques on the audio signals in order to interact with users via voice. In some examples, the voice-enabled devices may utilize speakers to output various sounds, such as tones and/or text-to-speech (TTS) audio, indicating to the users to speak loudly to be heard by the devices due to noise levels, or that the devices are unusable altogether due to high noise levels. Additionally, or alternatively, the voice-enabled devices may utilize one or more light emitting diodes (LEDs), such as a light bar of LEDs, to indicate noise levels and/or whether the device is unusable for speech processing due to high noise levels. In this way, voice-enabled devices may indicate to users that the user needs to speak loudly to be heard by their voice-enabled devices, or may have to move their voice-enabled devices and/or remove sound sources in the environment in order to use the speech-processing abilities of the devices.

The ability to perform speech-recognition on audio signals generated by the microphone decreases as noise levels around the microphone increase. Often, users are able to speak loud enough to be heard over sound or noise in their environment such that their voice-enabled devices are able to "hear" the user using their microphones to perform speech processing. However, as noise levels in the environments of the voice-enabled devices continue to increase, performance of speech-processing techniques begins to deteriorate. As voice-enabled devices are introduced into new environments, new sources of noise are also introduced that may cause performance issues for microphones that generate audio signals for speech processing.

As an example, voice-enabled devices may be utilized in vehicle environments, and users may install or mount the voice-enabled devices near air vents or windows such that the microphone of the voice-enabled devices are subject to various levels or airflow. While microphones of the voice-enabled devices may be usable for speech-processing when experiencing lower levels of airflows, the performance of the microphones when being used for speech processing deteriorates as airflow speed increases. Additionally, the microphones of the voice-enabled devices may abruptly become unusable when the airflow over the microphones has increased past a threshold airflow. For instance, when airflow is pushed beyond a certain flow rate, it becomes turbulent due to laminar-turbulent transition. When a voice-enabled device is positioned near an air vent that is pushing out turbulent air, the turbulent airflow may buffet the microphones severely causing excursions of the microphone diaphragm such that the microphones are unable to generate audio signals representing voice of the user. According to the techniques described herein, the voice-enabled devices may determine that the microphones are unusable when they are being buffeted by turbulent airflow, and use auditory indications and/or visual indications to notify the user that the device is unusable for speech-processing.

The voice-enabled devices may include a noise-level detection component that is configured to monitor, periodically or continuously, the energy/noise levels at their microphones. For instance, the noise-level detection component may utilize a sub-band energy leaky integrator with a hysteresis to monitor energy levels. The noise-level detection component may integrate the signal energy at the microphone over a short period of time (e.g., 100 milliseconds (ms), 200 ms, etc.), and normalize that number over a scale (e.g., 0-1, 0-100, etc.) to determine the microphone sensitivity according to a full scale of the microphone. In some examples, the top end of the scale may correspond to how loud a user can speak or yell to be hear over noise in the environment. In this way, if the noise-level detection component determines that the noise experienced at the microphone is at, or near, the top end of the scale, then the microphones are unable to "hear" the user's voice for purposes of speech recognition.

In some examples, the voice-enabled devices may further include a buffeting detection component configured to detect extreme excursions and saturation/clipping of the microphones of the devices. In some examples, buffeting detection component may operate similar to a level detector and analyze the energy levels at the microphones determined by the noise-level detection component. The buffeting detection component may determine whether one or more of the microphones of the voice-enabled devices are being buffeted. For instance, the buffeting detection component may simply apply a threshold energy level indicating buffeting to the energy levels determined by the noise-level detection component. If the energy levels are higher than the threshold energy level that indicates the microphones are being buffeted, the buffeting detection component may detect buffeting. In some examples, the buffeting detection component may observe the audio signals generated by the microphones and determine if the waves indicate buffeting. For instance, the waves of an audio signal generated by a microphone that is being buffeted may look more like a saturated wave, or a square wave, where the signal stays at the positive and/or negative maximum values, rather than a sine wave. In this way, and potentially other ways, the buffeting detection component may determine that one or more microphones are being buffeted.

The voice-enabled devices may include one or more indicator components configured to indicate the noise levels of the microphones of the devices, and/or whether the microphones are being buffeted. Depending on the voice-enabled device, and/or the preferences of the user, the indicator components may include a visual indicator component configured to provide visual feedback to users of the devices. Generally, the visual indicator component may map the output from the noise-level detection component to one or more LEDs on the voice-enabled devices. In some examples, the LEDs may be included in a light bar that indicates, based on the portion of the light bar that is illuminated by the LEDs, the current noise levels at the microphones. For example, if the microphones are receiving noise levels with an average absolute amplitude of 0.25, the visual indicator component may illuminate 25% of the light bar. In this way, the light bar may illuminate to let a user know they need to raise their voice to be heard over the noise by their voice-enabled device. Further, as the user raises their voice, the light bar may reflect the noise created by the user's voice and illuminate beyond the 25% mark to indicate that the user is being heard over the background noise or airflow.

Further, the visual indicator component may map output from the buffeting detection component to the light bar to indicate that the microphone(s) are experiencing buffeting, and are unusable. In some examples, the visual indicator component may cause the LEDs in the light bar to illuminate in various ways to indicate buffeting. As an example, the visual indicator component may cause the LEDs in the light bar to illuminate according to a pattern, such as a slow oscillation of all the LEDs in the light bar, or a random pattern. In some examples, all of the LEDs may stay lit and/or be illuminated in a different color that indicates to the user that buffeting is occurring. In this way, the user may determine, based on the LEDs in the light bar, that the device needs to be moved away from an air vent and/or window, or that the airflow from the vents needs to be lowered. In other words, the user may be apprised that simply raising their voice will not result in the voice-enabled device detecting their voice when buffeting is occurring, and that another action must be taken to interact with the device via voice.

In addition to the visual indicator component, or as an alternative to notify a user of noise levels, the voice-enabled devices may include an auditory indicator component configured to utilize one or more speakers to provide auditory feedback regarding the noise levels being experienced by microphones of the devices. For example, when no buffeting is being detected, the auditory indicator component may be used independently, or jointly, with the visual indicator component described above. The auditory indicator component may utilize methods from sonification such as sound mapping or synthesis to indicate the noise levels as detected by the noise-level detection component. For instance, the auditory indicator component may perform sonification methods that encode noise levels in terms of percentages to indicate the noise level detected by microphones of the devices. Additionally, the auditory indicator component may switch into a "warning mode" if the buffeting detection component determines that the one or more microphones are being buffeted so that the users can hear that there is buffeting due to airflow over the device. The auditory indicator component may utilize various auditory output via the speakers of the device, such as tonal output (e.g., beeping, alarms, etc.), and or words or phrases of text-to-speech (TTS) auditory output (e.g., "please move the device or turn down the air.").

The indicator components may selectively provide indications to the user regarding the noise levels experienced based on what the user is doing. For instance, if the user is driving a vehicle that a voice-enabled device is positioned in, the indicator components may provide auditory feedback (potentially in addition to visual feedback) to notify the user about high noise levels and/or buffeting so the user does not need to take their eyes off the road. In some examples, the techniques may be performed as part of an installation process, such as part of an out-of-box-experience (OOBE) that the user may step through when installing their device. For instance, the user may install their device in their vehicle such that they are able to interact with their car and/or mobile phone using voice, and/or perform other commands using voice. During the OOBE, the voice-enabled device (and/or the user's mobile phone executing an application for installing the voice-enabled device) may output various auditory and/or visual feedback to the user. For instance, the voice-enabled device and/or mobile phone may instruct the user to turn up the AC in their vehicle and place their voice-enabled device near the air vent to illustrate how the voice-enabled device will indicate that buffeting is occurring. In this way, the user will understand what auditory/ visual feedback indicates that the device is experiencing buffeting. Further, the voice-enabled device and/or mobile phone may adjust the illumination of the light bar and/or provide auditory feedback as the user moves the voice-enabled device around the interior or the vehicle while the air vents and/or music are turned up. In this way, the user may determine an optimal location to place the voice-enabled device in the vehicle to help ensure that the voice-enabled device is able to "hear" the user despite the AC/heat being turned all the way up, and/or the speakers of the car being turned up.

The techniques described herein improve the performance of voice-enabled devices by indicating to users that the device may be unusable for speech processing. Rather than having a voice-enabled device that is experiencing buffeting be unresponsive to voice commands from a user, the techniques described herein provide feedback so users understand why the voice-enabled device is unresponsive. Additionally, the techniques are rooted in computing technology in that audio signals generated by microphones of a voice-enabled device are analyzed to determine noise levels. The noise levels, and/or the audio signals themselves, may be analyzed to determine if the microphones are being buffeted and are unusable for speech processing. Additionally, although the techniques are described with respect to voice-enabled devices, or devices configured to communicate with a user via voice commands or speech, the techniques are equally applicable to any device that utilizes microphones to detect various noises or sounds. The techniques are applicable for any device where it may be advantageous to notify a user of the device regarding noise levels and/or buffeting of microphones.

While the techniques described herein are with reference to microphones being buffeted by airflow from vents and/or windows in a vehicle, the techniques are equally applicable for any environment in which a voice-enabled device may be installed and experience buffeting. For instance, a voice-enabled device may be positioned in a home and experience buffeting due to a fan in a room, ventilation from an HVAC system, and/or any other environment and source of airflow.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram of an example environment 100 in which a voice-enabled device 102 is positioned near an air vent 104 such that airflow 106 is buffeting a microphone of the voice-enabled device 102, thereby preventing the voice-enabled device 102 from detecting an utterance 108 of a user 110. As illustrated, the environment 100 includes a vehicle environment 112 where the voice-enabled device 102 is positioned in the vehicle interior 114.

Generally, voice-enabled devices 102 are configured to interact with users 110 via voice commands in utterances 108. However, if the voice-enabled devices 102 are unable to detect the utterances 108 due to noise, such as airflow 106, the voice-enabled devices 102 may be unresponsive to utterances 108 from users 110, thereby rendering functionality of the devices 102 useless and frustrating users. Some techniques are described below with respect to instances where the voice-enabled devices 102 are able to detect utterances 108, and response to the users 110.

In some examples, the voice-enabled devices 102 described herein may be relatively sophisticated in some respects. For example, the voice-enabled devices 102 may include one or more microphones and hardware, software, and/or firmware components, to detect and capture speech utterances 108 from a user 110. In some instances, the voice-enable devices 102 may be configured to receive a "wake" trigger (e.g., wake word, button input, etc.) which indicates to the voice-enabled device 102 that a user 110 is issuing a command via a speech utterance 108. The voice-enabled device 102 may proceed to capture, and stream, audio data representing the speech utterance to a network-based speech-processing system 116. Thus, the voice-enabled devices 102 described herein may be configured to detect and capture speech utterances 108 from a user 110.

While the voice-enabled devices 102 may perform some types of pre-processing on the audio data/signal representing the utterances 108, often, the voice-enabled devices 102 may be unsophisticated in some respects and have relatively low functionality. For instance, voice-enabled devices 102 may be configured to merely serve as an interface or "middle man" between a user 110 and a remote system or service, such as the speech-processing system 116 (e.g., "cloud-based service," "software as a service (SaaS)," "network accessible platform," etc.). In this way, the more intensive processing involved in processing the speech utterances 108 may be performed using large amounts of resources of remote, speech-processing systems 116, which may extend battery life performance of voice-enabled devices 102, and also reduce the amount of hardware and/or software included in the voice-enabled devices 102. For example, the voice-enabled devices 102 may include one or more microphones and components to detect and capture an utterance 108 of a user 110, and transmit, over one or more networks 118, audio data representing the utterance 108 to the remote speech-processing system 116 for further natural language processing to determine an intent of the utterance 108. In such examples, the voice-controlled devices 102 may include network interfaces and functionality for communicating data to the remote speech-processing system 116 over various networks 118, including personal area networks (PANs), wide area networks (WANs), local area networks (LANs), etc.

In some examples, the voice-enabled devices 102 may be unable to communicate over certain types of networks, such as WANs, to save battery power and/or reduce hardware and software requirements of the voice-enabled devices 102. However, the audio data that is generated by the voice-enabled devices 102 that represents the utterance 108 often must be sent to the remote speech-processing system 116 using various networks, including WANs. In such examples, the communication topologies in the various vehicle environments 112 may further include additional user devices 120 (e.g., phones, tablets, etc.) which are configured to communicate data over WANs (e.g., 3G, 4G, 4G LTE, etc.). In this way, the various topologies may include the user devices 120 to receive audio data from the voice-enabled devices 102, such as by a PAN and using short-range wireless communication protocols (e.g., Bluetooth, ZigBee, etc.), and the user device 120 may transmit the audio data on behalf of the voice-enabled device 102 to the remote speech-processing system 116 using WANs of network(s) 118.

Accordingly, in some examples the voice-enabled device 102 detects an utterance 108 from the user 110, and communicates audio data between the user device 120 and a vehicle computing device 122 based partly on a command in the utterance 108. In such examples, the utterance 108 is transmitted to the remote speech-processing system 116, and the communication of the audio data between the devices in the illustrative topologies is based on an intent of the utterance 108 determined by the remote speech-processing system 116. Generally, the voice-enabled device 102 and the user device 120 may be designed to operate from a fixed location, and in other embodiments, the voice-enabled device 102 and user device 120 may be portable or mobile. For instance, the voice-enabled device 102 and user device 120 may comprise handheld devices or other mobile devices, such as smartphones, tablet computers, media players, personal computers, wearable devices, various types of accessories, and so forth.

In examples where the voice-enabled device 102 is able to detect the utterance 108 of the user 110, such as a wakeword, the device 102 may generate audio data representing the utterance 108 and transmit the audio data to the speech-processing system 116, or to the user device 120 which transmits the audio data to the system 116 on behalf of the voice-enabled device 102. The speech-processing system 116 may generally refer to a network-accessible platform—or "cloud-based service"—implemented as a computing infrastructure of processors, storage, software, data access, and so forth that is maintained and accessible via the WAN network 118, such as the Internet. Cloud-based services may not require end-user knowledge of the physical location and configuration of the system that delivers the services. Common expressions associated with cloud-based services, such as the speech-processing system 116, include "on-demand computing", "software as a service (SaaS)", "platform computing", "network accessible platform", and so forth.

As illustrated, the speech-processing system 116 may be implemented as one or more computing devices including one or more servers, desktop computers, laptop computers, or the like. In one example, the speech-processing system 116 is configured in a server cluster, server farm, data center, mainframe, cloud computing environment, or a combination thereof. To illustrate, the speech-processing system 116 may include any number of devices that operate as a distributed computing resource (e.g., cloud computing, hosted computing, etc.) that provides services, such as storage, computing, networking, and so on. Thus, the speech-processing system 116 is generally implemented as network-accessible resources. These resources comprise one or more processors and computer-readable storage media executable on the processors. The computer-readable media may store various components, such as a speech-processing component 124 and a command processor 126. As noted above, upon the voice-enabled device 102 identifying the user 110 speaking the predefined wake word (in some instances) as part of the utterance 108, the voice-enabled device 102 may begin capturing audio from the vehicle environment 112 to generate audio data, or an audio signal, and send the audio data to the user device 120 which in turn begins uploading the audio data to the speech-processing system 116 over the network(s) 118.

In response to receiving this audio signal, the speech-processing component 124 may begin performing speech-processing techniques on the audio data. For example, an automated speech recognition (ASR) component of the speech-processing component 124 to process the audio data received from the user device 120 using automated speech recognition to generate text data representing the speech utterance from which one or more user voice commands may be identified. Further, a natural language understanding (NLU) component of the speech-processing component 124 to process the text data representing the speech utterance using natural language understanding to determine an intent (e.g., intent data) expressed by the user 110 in the utterance 108. For example, if the user issued a command to "Please play music from my playlist," the NLU component may determine that the user's intent is to have music data streamed from a music streaming service (e.g., Pandora, Spotify, Amazon Prime Music, etc.).

Once the speech-processing component 124 has identified the intent of the utterance 108 of the user 110, the speech-processing component 124 may provide an indication of the intent to a command processor 126. The command processor 126 may use the intent to determine a response for the processed utterance 108. For instance, the command processor 126 may work in conjunction with one or more speechlets that are configured to determine a response for the processed utterance 108, determine locations of relevant information for servicing a request from the user (e.g., network-based addresses at which the requested music audio data is stored), and/or generate and store the information if it is not already created, as well as route the identified intents to the appropriate destination command processor 126. The destination command processor 126 may be determined based on the intent determined using the NLU. For example, if the NLU output includes a command to play music (play music intent), the destination command processor 126 may be a music playing application, such as one located on the voice-enabled device 102 and/or the user device 120, or in a music playing appliance, configured to execute a music playing command. The command processor 126 may then cause the determined command to be sent to the user device 120 to cause the user device 120 and/or the voice-enabled device 102 to perform the appropriate response for the command. Additional details of the speech-processing system 116 can be found in the description for FIGS. 7A and 7B.

However, in some examples the voice-enabled device 102 may be unable to detect the utterance 108 of the user 110 due to high levels of noise in the vehicle interior 114. For instance, the ability to "detect" the utterances 108, or the ability to generate audio signals representing the utterances 108 sufficiently to perform speech-recognition on the audio signals, decreases as noise levels around the microphone of the voice-enabled device 102 increase. In some examples, the user 110 may be able to speak loud enough to be heard over sound or noise in the vehicle interior 114 such that their voice-enabled device 102 is able to "hear" the user 110 using their microphones to perform speech processing. However, as noise levels in the vehicle interior 114 of the voice-enabled device 102 continue to increase, performance of speech-processing techniques begins to deteriorate.

As illustrated in FIG. 1, the voice-enabled device 102 may be installed, placed, positioned, and/or mounted near a vent 104 from which airflow 106 is coming, such as air conditioning, heat, or other airflow 106. Generally, low levels of airflow 106 may not be problematic for the voice-enabled device 102 as the microphones are still able to generate audio signals that represent utterances 108 of the user 110 with sufficient strength for speech processing. However, the microphones may abruptly become unusable when the airflow 106 over the microphones has increased past a threshold airflow. For instance, when airflow 106 is pushed beyond a certain flow rate, it becomes turbulent due to laminar-turbulent transition. When the voice-enabled device 102 is positioned near the vent 104, and the vent 104 is pushing out turbulent air, the turbulent airflow 106 may buffet the microphones severely causing excursions of the microphone diaphragm such that the microphones are unable to generate audio signals representing the utterance 108 with sufficient strength for speech processing. Rather than allowing the voice-enabled device 102 to be rendered useless for voice interaction, the techniques described herein include determining that the microphones are unusable when they are being buffeted by turbulent airflow 106 (or other noise), and use auditory indications and/or visual indications to notify the user 110 that the device 102 is unusable for speech-processing.

In some examples, the voice-enabled device 102 may perform a process 128 that includes various steps for indicating to a user 110 information about the usability of the voice-enabled device 102 for speech processing. At 130, the voice-enabled device 130 may generate audio data representing noise in the vehicle interior 114. For example, one or more microphones of the voice-enabled device 102 may be utilized to generate one or more respective audio data (e.g., digital sampling) that represents the noise at the microphone(s) in the vehicle interior 114. The microphone(s) may sense the noise in the vehicle interior 114, and the voice-enabled device 102 may include components to digitally sample the output from the microphone(s) to generate audio data representing the noise.

At 132, the voice-enabled device 102 may determine that at least one of the microphone(s) is being buffeted by the airflow 106. For example, the voice-enabled device 102 may include a noise-level detection component that is configured to monitor, periodically or continuously, the energy/noise levels at the microphone(s). The noise-level detection component may utilize a sub-band energy leaky integrator with a hysteresis to monitor energy levels. The noise-level detection component may integrate the signal energy at the microphone(s) over a short period of time (e.g., 100 milliseconds (ms), 200 ms, etc.), and normalize that number over a scale (e.g., 0-1, 0-100, etc.) to determine the microphone sensitivity according to a full scale of the microphone. In some examples, the top end of the scale may correspond to how loud the user 110 can speak or yell to be hear over noise in the vehicle interior 114. In this way, if the noise-level detection component determines that the noise experienced at the microphone(s) is at, or near, the top end of the scale, then the microphones are unable to "hear" the user's 110 voice for purposes of speech recognition.

In some examples, the voice-enabled devices may further include a buffeting detection component configured to detect extreme excursions and saturation/clipping of the microphones of the device 102. In some examples, buffeting detection component may operate similar to a level detector and analyze the energy levels at the microphones determined by the noise-level detection component. The buffeting detection component may determine whether one or more of the microphones of the voice-enabled device 102 are being buffeted. For instance, the buffeting detection component may simply apply a threshold energy level indicating buffeting to the energy levels determined by the noise-level detection component. If the energy levels are higher than the threshold energy level that indicates the microphone(s) are being buffeted, the buffeting detection component may detect buffeting. In some examples, the buffeting detection component may observe the audio signals generated by the microphone(s) and determine if the waves indicate buffeting. For instance, the waves of an audio signal generated by a microphone that is being buffeted may look more like a saturated wave, or a square wave, where the signal stays at the positive and/or negative maximum values, rather than a sine wave. In this way, and potentially other ways, the buffeting detection component may determine that one or more microphones are being buffeted.

In examples where the voice-enabled device 102 includes multiple microphones, the buffeting detection component may be configured to determine that at least one of the microphones is being buffeted, or that all of the microphones are being buffeted. The noise-level detection component and buffeting detection component may analyze each of the audio signal streams generated by each of the multiple microphones to detect buffeting being experienced by one, multiple, or all of the microphones. In this way, and potentially in other ways, the buffeting detection component may detect buffeting occurring at microphone(s) of the voice-enabled device 102 resulting the buffeted microphone being unusable for speech processing and effectively capturing the utterance 102 of the user 110.

At 134, the voice-enabled device 102 may provide an indication that the microphone(s) are being buffeted by the airflow 106. For example, the voice-enabled device 102 may include one or more indicator components configured to indicate the noise levels of the microphones of the devices 102, and/or whether the microphones are being buffeted. Depending on the voice-enabled device 102, and/or the preferences of the user 110, the indicator components may include a visual indicator component configured to provide visual feedback to users 110 of the devices 102. Generally, the visual indicator component may map the output from the noise-level detection component to one or more LEDs on the voice-enabled device 102. In some examples, the LEDs may be included in a light bar that indicates, based on the portion of the light bar that is illuminated by the LEDs, the current noise levels at the microphones. For example, if the microphones are receiving noise levels with an average absolute amplitude of 0.25, the visual indicator component may illuminate 25% of the light bar. In this way, the light bar may illuminate to let a user know they need to raise their voice to be heard over the noise by their voice-enabled device. Further, as the user 110 raises their voice, the light bar may reflect the noise created by the user's voice 110 and illuminate beyond the 25% mark to indicate that the user 110 is being heard over the background noise or airflow.

Further, the visual indicator component may map output from the buffeting detection component to the light bar to indicate that the microphone(s) are experiencing buffeting, and are unusable. In some examples, the visual indicator component may cause the LEDs in the light bar to illuminate in various ways to indicate buffeting. As an example, the visual indicator component may cause the LEDs in the light bar to illuminate according to a pattern, such as a slow oscillation of all the LEDs in the light bar, or a random pattern. In some examples, all of the LEDs may stay lit and/or be illuminated in a different color that indicates to the user that buffeting is occurring. In this way, the user may determine, based on the LEDs in the light bar, that the device needs to be moved away from an air vent and/or window, or that the airflow from the vents needs to be lowered. In other words, the user 110 may be apprised that simply raising their voice will not result in the voice-enabled device 102 detecting their voice when buffeting is occurring, and that another action must be taken to interact with the device via voice (e.g. moving the device 102, lowering the airflow 106, etc.).

In addition to the visual indicator component, or as an alternative to notify a user 110 of noise levels, the voice-enabled device 102 may include an auditory indicator component configured to utilize one or more speakers to provide auditory feedback regarding the noise levels being experienced by microphones of the device 102. For example, when no buffeting is being detected, the auditory indicator component may be used independently, or jointly, with the visual indicator component described above. The auditory indicator component may utilize methods from sonification such as sound mapping or synthesis to indicate the noise levels as detected by the noise-level detection component. For instance, the auditory indicator component may perform sonification methods that encode noise levels in terms of percentages to indicate the noise level detected by microphones of the devices. Additionally, the auditory indicator component may switch into a "warning mode" if the buffeting detection component determines that the one or more microphones are being buffeted so that the users can hear that there is buffeting due to airflow over the device. The auditory indicator component may utilize various auditory output via the speakers of the device 102, such as tonal output (e.g., beeping, alarms, etc.), and or words or phrases of text-to-speech (TTS) auditory output (e.g., "please move the device or turn down the air.").

Although illustrated as being performed in a vehicle environment 112, the techniques are equally applicable in any environment (e.g., home, office, etc.). In some examples, the auditory indicator component may cause the vehicle computing device 122 to output at least some of the auditory feedback through speakers of the vehicle computing device 122. For instance, the voice-enabled device 102 may be communicatively connected to the vehicle computing device 122 using one or more methods depending on the vehicle computing device 122, such as Bluetooth, WiFi, USB, Auxiliary, and/or any other means to electronically communicate. The voice-enabled device 102 (or the user device 120) may send audio data to the vehicle computing device 122 to output according to logic of the auditory indicator component. The audio data may represent tonal output, icon data (earcon data), and/or TTS response audio data (e.g., an actual audio file containing one or more machine-generated words). In some examples, such as during an DOBE process, the user device 120 may output the auditory data on behalf of the voice-enabled device 102.

Generally, when the voice-enabled device 102 is introduced into the vehicle interior 114, an initialization process must be performed to communicatively couple the voice-enabled device 102, the user device 120, and the vehicle computing device 122 to each other. In some examples, the voice-enabled computing device 102 may require an initial setup process that is performed at least partly using the user device 120. For example, the user device 120 may download and install one or more applications which help manage the device 102, manage the flow of audio data between the devices, and perform the initialization process (or DOBE process). In some examples, the applications executing on the user device 120 may prepare the voice-enabled device 102 for use in different topologies between the device 102, vehicle computing device 122 and user device 120. For example, the applications may prompt the user 110, using one or more user interfaces presented on a display or auditory prompts from speakers of the user device 120 and/or voice-enabled device 102, to provide indications of how the devices are coupled to each other. As an example, the applications executing on the user device 120 may ask the user whether the vehicle computing device 122 is capable of communicating using a wireless connection, whether the user device 120 is connected to the vehicle computing device 122 via a physical connection, and other questions to help determine how the devices in are to be connected.

Further, as part of the DOBE process, the application executing on the user device 120 may request that the user 110 turn the airflow 106 to maximum, and/or turn speakers of the vehicle computing device 122 to maximum, and have the user 110 interact with the voice-enabled device 102. For instance, as the user 110 positions their voice-enabled device 102 at different locations in the vehicle interior 114, the voice-enabled device 102 (and/or the user's user device 120 (e.g., mobile phone, tablet, etc.)) executing an application for installing the voice-enabled device 102) may output various auditory and/or visual feedback to the user 110. For instance, the voice-enabled device 102 and/or user device 120 may instruct the user 110 to turn up the AC in their vehicle and place their voice-enabled device 102 near the air vent 104 to illustrate how the voice-enabled device 102 will indicate that buffeting is occurring. In this way, the user 110 will understand what auditory/visual feedback indicates that the device 102 is experiencing buffeting. Further, the voice-enabled device 102 and/or user device 120 may adjust the illumination of the light bar and/or provide auditory feedback as the user 110 moves the voice-enabled device 102 around the vehicle interior 114 while the air vents and/or music are turned up. In this way, the user 110 may determine an optimal location to place the voice-enabled device 102 in the vehicle interior 114 to help ensure that the voice-enabled device 102 is able to "hear" the user 110 despite the AC/heat being turned all the way up, and/or the speakers of the car being turned up.

Due to the different types of audio data that is to be streamed from the user device 120 through the voice-enabled device 102, and in some examples ultimately to the vehicle computing device 122, the voice-enabled device 102 may be communicatively coupled to the user device 120 using wireless connections in addition to the BLE network. For instance, the voice-enabled device may be coupled to the user device 120 using additional Bluetooth standards or protocols, such as the Bluetooth Advanced Audio Distribution Profile (A2DP) for communicating/streaming various audio data (e.g., music audio data), and/or the Bluetooth Hands-Free Profile (HFP). Thus, the voice-enabled device 102 may be communicatively coupled to the user device 120 using an A2DP network and/or an HFP network. In this way, the user device 120 may receive call audio data via the network 118, and stream the call audio data over the HFP network to the voice-enabled device 102, which in turn sends the call audio data to the vehicle computing device 122 to be output on speakers of the vehicle associated with the vehicle computing device 122. Additionally, the voice-enabled device 102 may capture utterances 108 from the user 110 that is part of a streaming voice call, and send call audio data back over the HFP network to the user device 120 for transmission across the network to the other user device performing the phone call. Similarly, the user device 120 may stream music audio data from a music source, such as a network-based music service, and send the music audio data over the A2DP network to the voice-enabled device 102, which in turn sends the music audio data over a physical connection to the vehicle computing device 122 to be output on the speakers of the vehicle.

In some examples, additional audio data may be sent over the networks 142. For instance, the TTS response audio data and/or earcon audio data may be sent over a connection from the user device 120 to the voice-enabled device 102. Depending on the configuration of the voice-enabled device 102 and vehicle computing device 122, and/or preferences of the user 110, one or both of the TTS response audio data and the earcon audio data may be output on speakers of the voice-enabled device 102. Alternatively, one or both of the TTS response audio data and the earcon audio data may be send over a wired and/or wireless connection to the vehicle computing device 122 to be output on speakers associated with the vehicle computing device 122.

The user device 120 may comprise any type of computing device (e.g., telephone device, tablet device, laptop computing device, mobile device, etc.) configured to send and receive data. In some examples, the user device 120 may be configured to send and receive data over various types of networks, such as the BLE network as well as a WAN network. For instance, the user device 120 may be configured to send and receive data over the network(s) 118, which may include wireless wide area networks (WWANs), such as 3G networks, 4G networks, 4G LTE networks, and so forth. While illustrated as being a WAN network 118, the network 118 may alternatively be any other type of network configured to send and receive data between computing devices, such as Personal Area Networks (PANs), Local Area Networks (LANs), Campus Area Networks (CANs), Metropolitan Area Networks (MANs), Broadband Global Area Networks (BGANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. In some examples, the network 118 may represent an array of wired networks, wireless networks (e.g., WiFi), or combinations thereof.

Figure 2:
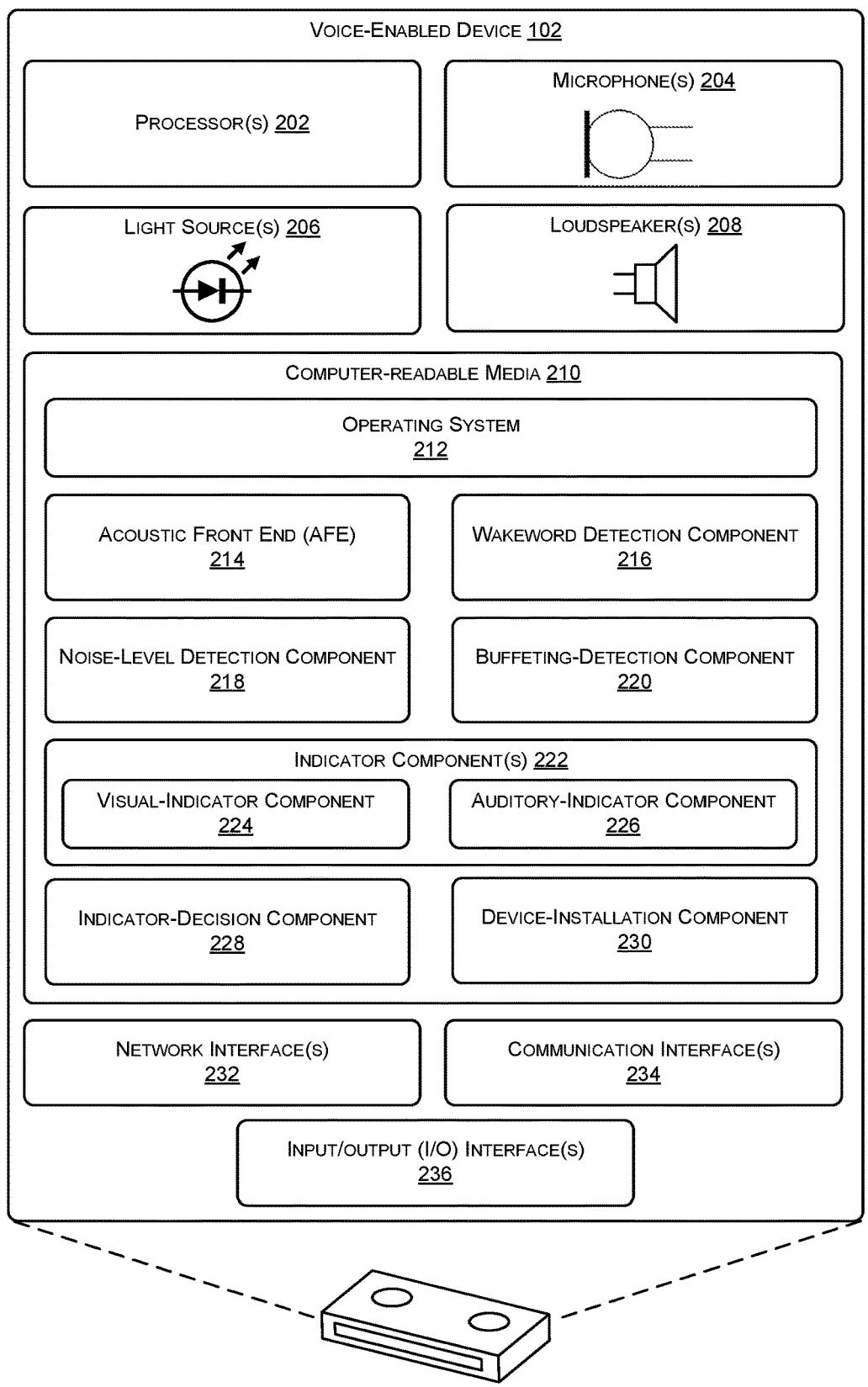
FIG. 2 illustrates a block diagram of example components of a voice-enabled device which determines noise levels at microphones of the device, determines whether the noise levels are indicative of buffeting of the microphones of the device, and provides indications of the noise levels and/or whether buffeting is occurring.

FIG. 2 illustrates a block diagram of example components of a voice-enabled device 102 which determines noise levels at microphones of the device 102, determines whether the noise levels are indicative of buffeting of the microphones of the device 102, and provides indications of the noise levels and/or whether buffeting is occurring. In some examples, the voice-enabled device 102 may comprise a fixed device in an interior of a vehicle, or a mobile device carried with the user 110. For instance, the voice-enabled device 102 may be fixed to, or part of, a vehicle head unit. For instance, the voice-enabled device 102 may be associated with, or a part of, the vehicle computing device 122. In some examples, the voice-enabled device 102 may comprise a mobile device, such as a phone, table laptop computer, netbook, or other computing device.

The voice-controlled device 102 may be implemented as a standalone device that is relatively simple in terms of functional capabilities with limited input/output components, memory, and processing capabilities. For instance, the voice-controlled device 102 may not have a keyboard or keypad. Nor does it have a display (other than lights, for instance) or touch screen to facilitate visual presentation and user touch input. Instead, the device 102 may be implemented with the ability to receive and output audio, a network interface (wireless or wire-based), power, and processing/memory capabilities. In some examples, the network interface may be limited in that it is not capable of communicating over certain networks, such as wide area networks. In certain implementations, a limited set of one or more input components may be employed (e.g., a dedicated button to initiate a wireless connection configuration, power on/off, etc.). Nonetheless, the primary and potentially only mode of user interaction with the voice-enabled device 102 is through voice input and audible output. In some instances, the voice-enabled device 102 may simply comprise a microphone, a power source (e.g., a battery), and functionality for sending generated audio signals to another device.

In the illustrated implementation, the voice-enabled device 102 includes one or more processors 202, one or more microphones 204, one or more light sources (e.g., LEDs) 206 including one or more LEDs, and one or more loudspeakers 208. The processor(s) 202 may process data and power the various hardware, software, and firmware components of the voice-enabled device 102. The processor(s) 202 may comprise any type of computer processor to power components of the voice-enabled device 102, such as a central processing unit (CPU), graphics processing unit (GPU), digital signal processor (DSP), and/or any other processor or any combination of processors.

The microphone(s) 204 may include one or more microphones which may include sensors (e.g., transducers) configured to receive sound. The microphone(s) 204 may generate input signals for audio input (e.g., sound), such as utterances 108, airflow 106, music data, and/or other sound. For example, the microphone(s) 204 may determine digital input signals for the utterance 108 of the user 110. In some instances, the microphone array 204 is implemented in an array that is arranged in a geometric pattern, such as a linear geometric form, circular geometric form, or any other configuration. The microphone(s) 204 may include omni-directional microphones, directional microphones (e.g., shotgun microphones), and so on. Although the microphone(s) 204 can be an array and include two or more microphones, in some instances, the voice-enabled device 102 may simply include a single microphone 204. The one or more microphones 204 may be configured to each generate audio signals, or audio data, representing sound in an environment of the voice-enabled device 102. In some examples, the microphone(s) 204 produce audio signals/data representing sound from the environment of the voice-enabled device 102, such speech utterances 112 by the user 104. The audio signals produced by the microphone(s) 204 may comprise directional audio signals or may be used to produce directional audio signals, where each of the directional audio signals emphasizes audio from a different radial direction relative to the microphone(s) 204.

The one or more light sources 206 may comprise any type of light source such as LEDs, compact fluorescent lamps (CFLs), and/or any other light source. For instance, the light source(s) 206 may include a single LED, or multiple LEDs 206 arranged in a particular order (e.g., light bar), configured to illuminate or otherwise emit light. The light source(s) 206 may comprise multiple LEDs arranged in a light bar that emit light when suitable current is applied to their leads. In some examples, the LEDs of the light source(s) 206 may define the light bar and be selectively activated by the voice-enabled device 102 to illuminate in a pattern, in varying colors, at a same time, individually, and/or any other sequence or illumination that is known.

The voice-enabled device may also include the loudspeakers(s) 208 to output audio sounds represented by audio data. The loudspeaker(s) 208 may be apparatus that convert electrical impulses into sound, in some examples. The loudspeakers(s) 208 may be utilized to output auditory feedback, and/or in some examples be used in conjunction with the microphone(s) 204 to facilitate a conversation with the user 110. For instance, the device 102 may stream audio data representing speech utterances of the user 110 to the speech-processing system 116, and receive TTS response audio data to output using the loudspeakers(s) 208 to facilitate a dialog with the user 110.

The voice-enabled device 102 may further include computer readable media 210 to store various components, including an operating system 212 that is configured to manage hardware and services within and coupled to the voice-enabled device 102 for the benefit of other modules. In addition, the computer-readable media 210 may store one or more applications that a user 110 may interact with by issuing voice-commands to the voice-enabled device, such as a music player, a timer, a calendar, and a personal shopper. However, the voice-enabled device 102 may include any number or type of applications and is not limited to the specific examples shown here. The music player may be configured to play songs or other audio files. The timer may be configured to provide the functions of a simple timing device and clock. The personal shopper may be configured to assist a user 110 in purchasing items from web-based merchants.

The computer-readable media 210 may further store an acoustic front end (AFE) 214 and a wakeword detection component 216. The AFE component 214 may perform various pre-processing on the audio signals generated by the microphone(s) 204, such as acoustic echo cancellation, noise cancellation or reduction, beamforming, filtering, and/or other acoustic processing. For instance, the AFE 214 may generally attempt to isolate the portion of the audio signal that represents the utterance 108 of the user 110. The wakeword detection component 216 may perform various techniques to identify or detect a predefined wakeword, or keyword, from the audio signals representing the utterances 108 of the user. For instance, the utterance 112 may include or be preceded by a wakeword or other trigger expression or event that is spoken by the user 110 to indicate that subsequent user speech is intended to be received and acted upon by the voice-enabled devices 102 and/or speech-processing system 116. The voice-enabled device 102 may detect the wakeword and begin streaming audio signals to the speech-processing system 116. In some instances, the voice-enabled device 102 may operate in a low-functionality mode and analyze sound using ASR processing. When the wakeword is detected using ASR, the voice-enabled device 102 may begin streaming the audio signal, and other data, to the user device 120, which in turn streams the audio signal/data to the speech-processing system 116. The wakeword may be a reserved keyword that is detected locally by the voice-enabled device 102, such as by using an expression detector that analyzed audio signals produced by the microphone(s) 204 of the voice-enabled device 102 using ASR techniques to detect the wakeword, which generally may be a predefined word, phrase, or other sound. Such an expression detector may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal. However, in some examples, the noise in the environment of the voice-enabled device 102 may make it difficult, or impossible for the microphone(s) 204 to generate audio signals that are usable for speech processing by the wakeword detection component 216 and/or speech-processing system 116.

The computer-readable media 210 may further store a noise-level detection component 218 configured to monitor, periodically or continuously, the energy/noise levels at the microphone(s) 204. For instance, the noise-level detection component 218 may analyze audio signals generated by each of the one or more microphones 204, such as by representing the audio signals in the frequency domain using various transforms, such as a Fourier transform (e.g., fast Fourier transform), Hartley transform, or any other transform. The noise-level detection component 218 may utilize a sub-band energy leaky integrator with a hysteresis to monitor energy levels. The noise-level detection component 218 may integrate the signal energy at the microphone(s) 204 over a period of time (e.g., 100 milliseconds (ms), 200 ms, etc.), and normalize that number over a scale (e.g., 0-1, 0-100, etc.) to determine the microphone sensitivity according to a full scale of the microphone. In some examples, the top end of the scale may correspond to how loud a user 110 can speak or yell to be hear over noise in the environment. In this way, if the noise-level detection component 218 determines that the noise experienced at the microphone(s) 204 is at, or near, the top end of the scale, then the microphone(s) 204 are unable to "hear" the user's voice for purposes of speech recognition. In some examples, the noise-level detection component 218 may simply do root means square for the samples over the period of time and average them out with a leaky integrator. However, the noise-level detection component 218 may perform any type of method or technique for determining or estimating the energy levels for noise (or sound) at the microphone(s) 204.

The computer-readable media 210 may further store a buffeting-detection component 220 configured to detect extreme excursions and saturation/clipping of the microphone(s) 204 of the device 102. In some examples, buffeting-detection component 220 may operate similar to a level detector and analyze the energy levels at the microphone(s) 204 determined by the noise-level detection component 218. The buffeting-detection component 220 may determine whether one or more of the microphones 204 of the voice-enabled device 102 are being buffeted. For instance, the buffeting-detection component 220 may simply apply a threshold energy level indicating buffeting to the energy levels determined by the noise-level detection component 218. If the energy levels are higher than the threshold energy level that indicates the microphone(s) 204 are being buffeted, the buffeting-detection component 220 may detect buffeting.

In some examples, the buffeting-detection component 220 may observe the audio signals generated by the microphone(s) 204 and determine if the waves indicate buffeting. For instance, the waves of an audio signal generated by a microphone that is being buffeted may look more like a saturated wave, or a square wave, where the signal stays at the positive and/or negative maximum values, rather than a sine wave. In this way, and potentially other ways, the buffeting detection component may determine that one or more microphones are being buffeted. In some examples, the buffeting-detection component 220 may run in parallel for each of the microphone(s) 204 and determine if at least one of the microphones 204 is being buffeted, or if all of the microphone(s) are being buffeted. In some instances, the buffeting-detection component 220 may determine what the ratio of values are at the maximum(s) for the waveform representing the noise compared to the total ratio of the samples, and put a threshold on that. For instance, the buffeting-detection component 220 may analyze samples of the audio signal for a period of time, and determine that more than 50% of the samples are above 0.99 (e.g., at the maximum) out of the total number of samples. This may indicate that there is clipping occurring, and the buffeting-detection component 220 may determine that the corresponding microphone(s) 204 are being buffeted. In some examples, the buffeting-detection component 220 may determine that the waveform representing the noise has gone into a non-linear phase rather than a linear increase, which may indicate buffeting. For instance, the waveform may appear similar to a square wave such that a portion of the samples lie at an extreme or a maximum.

The computer-readable media 210 may further include one or more indicator components 222, such as a visual-indicator component 224 and/or an auditory-indicator component 226. Generally, the indicator component(s) 222 may be configured to indicate the noise levels of the microphone(s) 204 of the device 102, and/or whether the microphone(s) 204 are being buffeted. Depending on the voice-enabled device 102, and/or the preferences of the user 110, the indicator component(s) 222 may include the visual-indicator component 224 configured to provide visual feedback to users 110 of the device 102. Generally, the visual-indicator component 224 may map the output from the noise-level detection component 218 to one or more LEDs (e.g., light sources 206) on the voice-enabled device 102. In some examples, the LEDs (e.g., 3 LEDs, 5 LEDs, 15 LEDs, etc.) may be included in a light bar that indicates, based on the portion of the light bar that is illuminated by the LEDs, the current noise levels at the microphone(s) 204. For example, if the microphone(s) 204 are receiving noise levels with an average absolute amplitude of 0.25, the visual indicator component may illuminate 25% of the light bar. In this way, the light bar may illuminate to let a user 110 know they need to raise their voice to be heard over the noise by their voice-enabled device. Further, as the user raises their voice, the light bar may reflect the noise created by the user's voice and illuminate beyond the 25% mark to indicate that the user is being heard over the background noise or airflow. As noted above, the maximum number of LEDs may match a scale of noise levels that correspond to how loud a user 110 can issue utterances 108. In this way, the user 10 knows that if a large portion of the light bar is illuminated, such as 80-90%, the user 110 will have to be talking very loudly or yelling to be heard by the microphone(s) 204 for purposes of speech processing. Similarly, when a small portion of the light bar is illuminated by LEDs, the user 110 may be notified that they do not need to speak very loudly for an utterance 108 to be detected by the microphone(s) 204 for speech processing.

In one example, the noise-level detection component 218 may analyze bits that are output by the microphone(s) 204. For instance, a particular microphone 204 may be a 16-bit microphone where the microphone 204 outputs bits to represent the sampling of the noise in the environment sensed by the microphone 204. Each bit can be a 0 or a 1, and high number of bits indicate that there is more noise in the environment sensed by the microphone 204. Thus, the noise-level detection component 218 may detect the noise levels based on the number of bits in the samples being a 1 versus a 0. Depending on the microphone, 1 bit may generally map to 6 dB. In such examples, for a 16-bit microphone 204, low noise levels may be roughly 50 dB, and high noise levels may be 96 dB. In such examples, the visual-indicator component 224 may linearly map the dB level to the number of LEDs 206 that are to be illuminated. The linear mapping may include utilizing a formula that linearly maps the dB levels to a number of LEDs 206 which is scalable for any number of LEDs 206. For instance, the formula may calculate the ration of the current noise level detected by the microphone 204 versus the entire range of the microphone, and multiply that ratio by the number of LEDs 206 to determine how many LEDs 206 to illuminate. Thus, if the measured dB noise level is 60 dB, the usable range of the microphone 204 is 50 dB to 100 dB, and there are 10 LEDs 206, then the calculation performed for the mapping may be [(60 dB−50 dB)/(100 dB−50 dB)]×10 LEDS=2 LEDs to be illuminated. As another example, if the measured dB noise level is 90 dB, then the calculation performed may be [(90 dB−50 dB)/(100 dB−50 dB)]×10 LEDS=8 LEDs to be illuminated. In this way, the number of LEDs 206 utilized may be scalable to represent the amount of noise in the environment of the voice-enabled device 102. In some examples, the minimum range of the microphone 204 may be based on common levels of noise in a vehicle with lower levels of sound (e.g., sound of engine, sound of the car driving on the road, etc.). Conversely, the higher range (e.g. 96 dB, 100 dB, etc.) of the microphone 204 may be based on how loud a user can speak to be heard by the voice-enabled device 102.

As the noise levels change around the microphone(s) 204, the visual-indicator component 224 may cause the number of LEDs that are illuminated to change to reflect the change in noise levels. For instance, if the noise levels increase, additional LEDs may be illuminated, and vice-versa if the noise levels decrease. In some instances, the visual-indicator component 224 may additionally, or alternatively cause the LEDs to change light patterns, light colors, etc., to illustrate changes in noise levels.

In some examples, the visual-indicator component 224 may further map output from the buffeting-detection component 220 to the light source(s) 206, such as a light bar, to indicate that the microphone(s) 204 are experiencing buffeting, and are unusable. In some examples, the visual-indicator component 224 may cause the LEDs in the light bar to illuminate in various ways to indicate buffeting. As an example, the visual indicator component may cause the LEDs in the light bar to illuminate according to a pattern, such as a slow oscillation of all the LEDs in the light bar, or a random pattern. In some examples, all of the LEDs may stay lit and/or be illuminated in a different color that indicates to the user 110 that buffeting is occurring. In this way, the user 110 may determine, based on the LEDs in the light bar, that the device 102 needs to be moved away from an air vent 104 and/or window, or that the airflow from the vents 104 needs to be lowered. In other words, the user 110 may be apprised by the light source(s) 206 that simply raising their voice will not result in the voice-enabled device 102 detecting their voice when buffeting is occurring, and that another action must be taken to interact with the device via voice.

In addition to the visual-indicator component 224, or as an alternative to notify a user 110 of noise levels, the computer-readable media 210 may further include an auditory-indicator component 226 configured to utilize the loudspeaker(s) 208 to provide auditory feedback regarding the noise levels being experienced by microphones of the device 102. For example, when no buffeting is being detected, the auditory-indicator component 226 may be used independently, or jointly, with the visual-indicator component 224 described above. The auditory-indicator component 226 may utilize methods from sonification such as sound mapping or synthesis to indicate the noise levels as detected by the noise-level detection component 218. For instance, the auditory-indicator component 226 may perform sonification methods that encode noise levels in terms of percentages to indicate the noise level detected by microphone(s) 204 of the device 102. Additionally, the auditory-indicator component 226 may switch into a "warning mode" if the buffeting-detection component 220 determines that the microphone(s) 204 are being buffeted so that the user 110 can hear that there is buffeting due to airflow 106 over the device 102. The auditory-indicator component 226 may utilize various auditory output via the speakers of the device 102, such as tonal output (e.g., beeping, alarms, etc.), and or words or phrases of text-to-speech (TTS) auditory output (e.g., "please move the device or turn down the air.").

In some examples, the computer-readable media 210 may include an indicator-decision component 228 configured to selectively provide indications to the user 110 regarding the noise levels experienced based on what the user 110 is doing. For instance, if the user 110 is driving a vehicle in which the voice-enabled device 102 is positioned, the indicator-decision component 228 may provide auditory feedback (potentially in addition to visual feedback) to notify the user 110 about high noise levels and/or buffeting so the user 110 does not need to take their eyes off the road. Further, the indicator-decision component 228 may determine to output indicators that the microphone(s) 204 are being buffeted, as opposed to outputting indicators that illustrate the noise levels.

The computer-readable media 210 may further store a device-installation component 230 configured to help a user 110 through an DOBE process. The device-installation component 230 may help the user 110 install their device 102 in their vehicle such that they are able to interact with their car and/or mobile phone using voice, and/or perform other commands using voice. During the DOBE, the device-installation component 230 (and/or the user device 120 executing an application for installing the voice-enabled device 102) may output various auditory and/or visual feedback to the user 110. For instance, the voice-enabled device 102 and/or user device 120 may instruct the user 110 to turn up the AC in their vehicle and place their voice-enabled device 102 near the air vent 104 to illustrate how the voice-enabled device 102 will indicate that buffeting is occurring. In this way, the user 110 will understand what auditory/visual feedback indicates that the device 102 is experiencing buffeting. Further, the voice-enabled device 102 and/or user device 120 may adjust the illumination of the light bar and/or provide auditory feedback as the user 110 moves the voice-enabled device 102 around the interior or the vehicle while the air vents 104 and/or music are turned up. In this way, the user 110 may determine an optimal location to place the voice-enabled device 102 in the vehicle to help ensure that the voice-enabled device is able to "hear" the user despite the AC/heat being turned all the way up, and/or the speakers of the car being turned up.

In some examples, the device-installation component 230 may cause the light bar to illuminate portions corresponding to the noise in the environment of the device 102 such that, as the user 110 moves the device 102 to different locations in the vehicle interior 114, the light bar in real time, or near-real-time, indicates to the user 110 where the more optimal locations are to install the device 102.

The voice-enabled device 102 may include one or more network interfaces 232 configured to communicate data over various networks, such as network(s) 118. The network interface(s) 232 may include a wireless or Wi-Fi network communications interface, an Ethernet communications interface, a cellular network communications interface, a Bluetooth communications interface, etc., for communications with devices over various types of networks, including wide-area network, local-area networks, private networks, public networks etc. In the case of a wireless communications interfaces, such interfaces may include radio transceivers and associated control circuits and logic for implementing appropriate communication protocols. The network interface(s) 232 may utilize one or more antennas of the user device to send and receive signals over various networks. The voice-enabled device 102 may further include one or more communication interfaces 234 to facilitate communications with devices, such as an auxiliary port, a USB port, and/or any other type of communication interface.

The voice-enabled device 102 may include one or more input/output (I/O) interfaces 236. The I/O interface(s) 236 may provide means for users 110 to provide input, and receive outputs. The I/O interface(s) 236 may include one or more buttons (e.g., a dedicated button to initiate a wireless connection configuration, power on/off, etc.), displays, keyboards, navigation buttons, touch screens, LEDs, a mouse, haptic sensors, joysticks, and so forth, for receiving input from a user 110, and also for outputting information or data to a user 110. Additionally, the voice-enabled device 102 may plug into an external power source, and/or include an internal power source, such as a battery.

Figure 3:
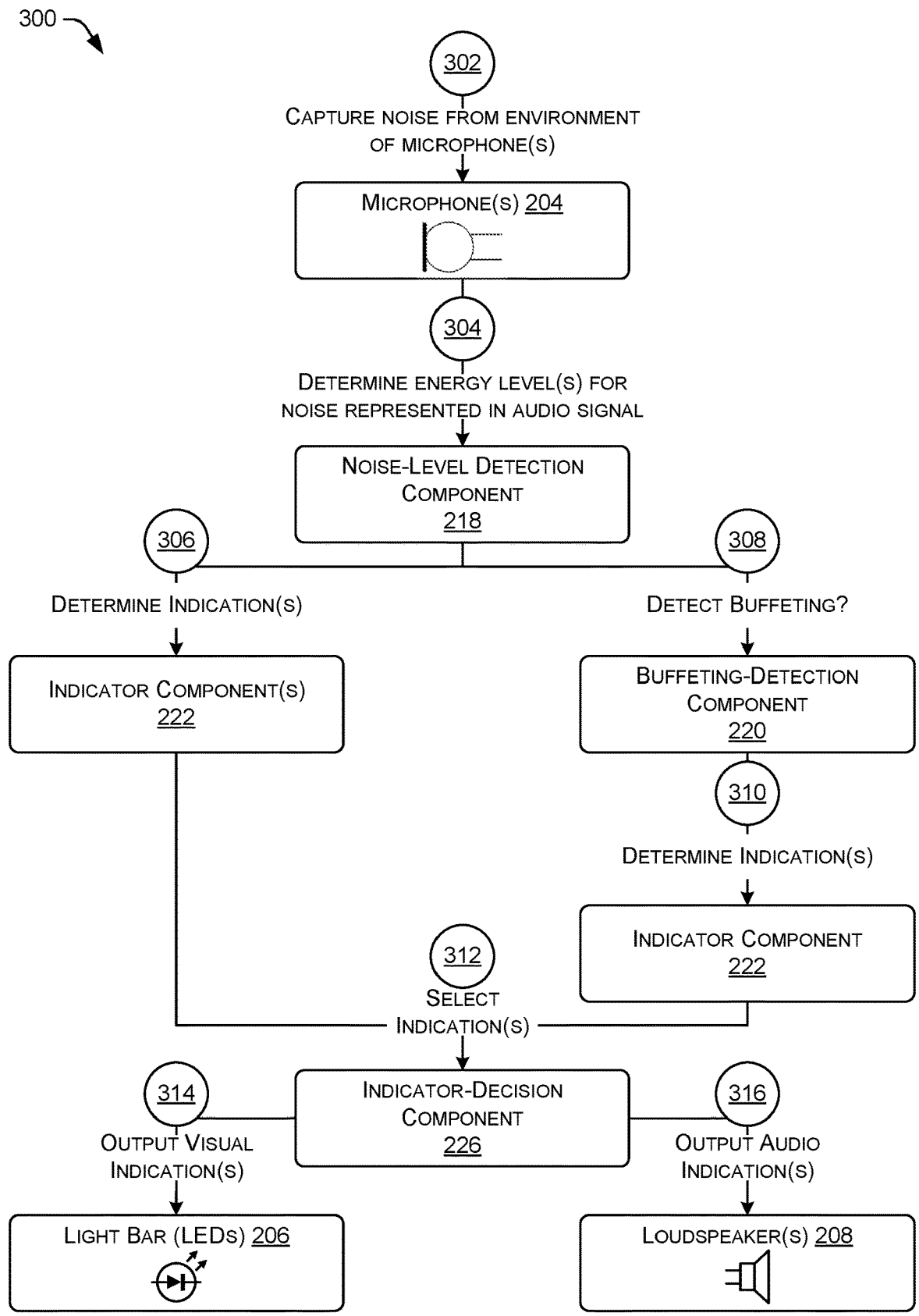
FIG. 3 illustrates a flow diagram of an example process for a voice-enabled device to detect noise levels at a microphone, and indicate the noise levels and/or that the microphone is being buffeted.

FIG. 3 illustrates a flow diagram of an example process 300 for a voice-enabled device 102 to detect noise levels at a microphone 204, and indicate the noise levels and/or that the microphone 204 is being buffeted.

At 302, the microphone(s) 204 may capture noise from an environment of the voice-enabled device 102. Depending on the device 102, there may be a single microphone 204, or multiple microphones 204 generating respective audio signal representing respective noise detected at the microphone(s) 204.

At 304, the noise-level detection component 218 may determine energy level(s) for noise represented in the audio signal (or audio data), or the multiple audio signals from each of the microphone(s) 204.

At 306, the indicator component(s) 222 may determine indicators to utilize to notify the user 110 of the noise levels at the microphone(s) 204. For instance, depending on how the indicator component(s) 222 are configured, the indicator component(s) 222 may determine visual and/or auditory feedback to provide the user 110. The indicator component(s) 222 may map the noise levels to LEDs that are to be illuminated, and/or map the noise levels to appropriate auditory feedback according to sonification techniques.

At 308, the buffeting-detection component 220 may determine whether the microphone(s) 204 are being buffeted according to the techniques described herein, and/or utilizing other techniques for detecting buffeting. If the buffeting-detection component 220 determines that there is buffeting of at least one microphone 204, the indicator component(s) 222 may determine auditory and/or visual mappings to appropriate audio and/or visual feedback to notify the user 110 that a microphone 204 is being buffeted.

In some examples, to detect buffeting, the buffeting-detection component 220 may comprise a threshold counter that analyzes audio data output from a microphone 204. For example, the buffeting-detection component 220 may be configured to determine how many samples obtained from the microphone 204 over a period of time are over a threshold value that indicates buffeting. For example, the period of time may be $\frac{1}{10}$th of a second and the buffeting-detection component 220 may sample at 16 kHz resulting in 1,600 samples. The buffeting-detection component 220 may be configured to determine how many of the 1,600 samples are excursions over the threshold that indicate buffeting. If more than a threshold number of excursions are outside the threshold (e.g., 100, 200, or any number determined to indicate buffeting), the buffeting-detection component 220 may determine that the microphone 204 is being buffeted. In this way, the buffeting-detection component 220 may simply perform comparisons and summations on audio data samples to detect buffeting.

In some examples the buffeting-detection component 220 may determine that buffeting is occurring on one microphone 204, or on multiple microphones 204, before indicating to the user that buffeting is occurring. For instance, if the voice-enabled device 102 includes multiple microphones 204 that are utilized to preform beamforming or other functions that require audio data from all the microphones, the algorithms used to perform beamforming and/or other functions may break down when one of the microphones 204 is being buffeted. In such examples, the buffeting-detection component 220 may determine to indicate to the user that buffeting is occurring, and a remedial action needs to be taken by the user to stop the buffeting of the microphone 204, even if other microphones 204 are not being buffeted.

In another example, the buffeting-detection component 220 may not indicate that buffeting is occurring until multiple, or all, of the microphones 204 in the voice-enabled device 102 are being buffeted. For example, if the wakeword detection component 216 (and/or other components) are performing ASR on a single stream of audio data from a microphone 204 that is being buffeted, the buffeting-detection component 220 may detect the buffeting, and switch the stream of audio data being analyzed to another microphone 204 that is not being buffeted. Thus, the buffeting-detection component 220 need not necessarily indicate buffeting if one or more microphones 204 are not being buffeted, and their audio data streams are usable for various purposes by the voice-enabled device 102. Thus, the buffeting-detection component 220 may select between streams of audio data from different microphones 204 based on whether or not the microphones 204 are being buffeted. In some examples, the buffeting-detection component 220 may stop analyzing an audio data stream from a microphone 204 that is being buffeted and switch to an audio data stream from a microphone 204 that is not being buffeted, but still determine to utilize the indicator component 222 to notify the user that the microphone 204 is being buffeted and that an action to remedy the buffeting may be taken.

At 312, the indicator-decision component 226 may select one or more indications to output based on various factors. For instance, if one or more microphones 204 are being buffeted, the indicator-decision component 226 may output an auditory and/or visual indication that buffeting is occurring. As another example, if the indicator-decision component 226 determines that the user 110 is operating the vehicle (e.g., the voice-enabled device 102 is able to communicate with the vehicle computing device 122 and/or receives power from the vehicle), the indicator-decision component 226 may determine to utilize auditory feedback in addition to, or in lieu of, visual feedback, so the user 110 is notified of buffeting and/or noise levels without having to look at the voice-enabled device 102.

Once the indicator-decision component 226 has selected the appropriate indication(s) at 312, the process 300 proceeds to at least one of outputting visual indications at 314 using the light bar, and/or outputting audio indications using the loudspeaker(s) 208.

Figure 4A:
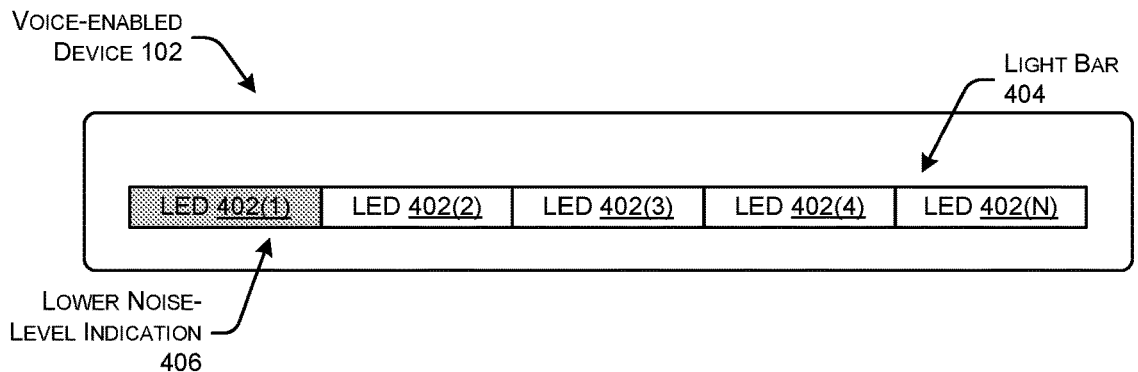
FIGS. 4A-4C illustrate example diagrams of a light bar of a voice-enabled device that is usable to indicate noise levels at the microphones of the voice-enabled device.
Figure 4B:
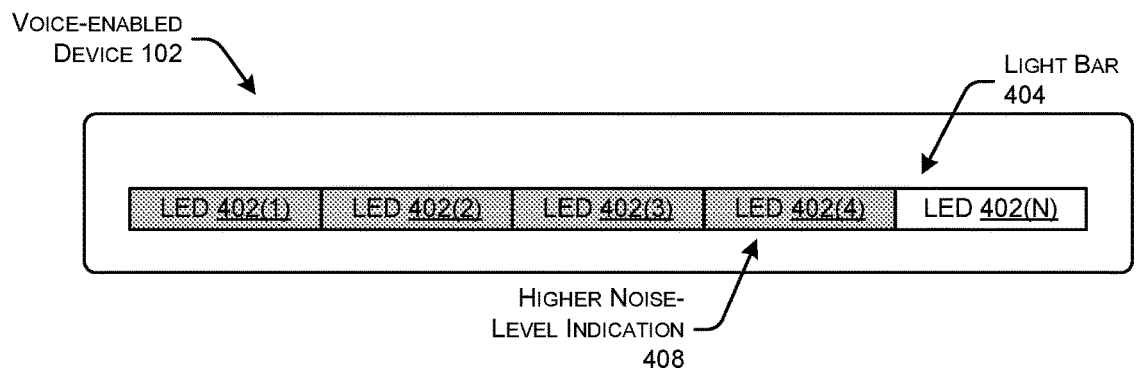
Figure 4C:
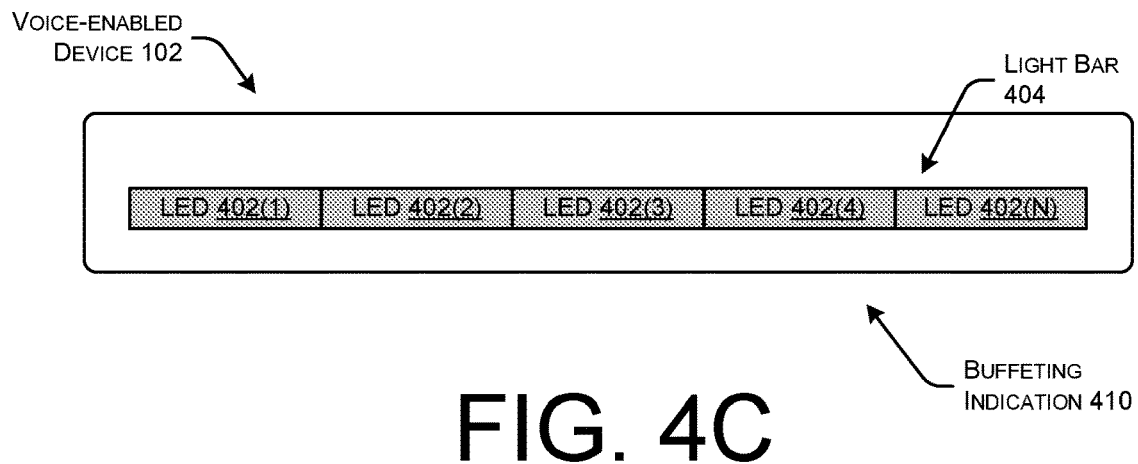

FIGS. 4A-4C illustrate example diagrams of a light bar of a voice-enabled device that is usable to indicate noise levels at the microphones of the voice-enabled device.

Figure 5:
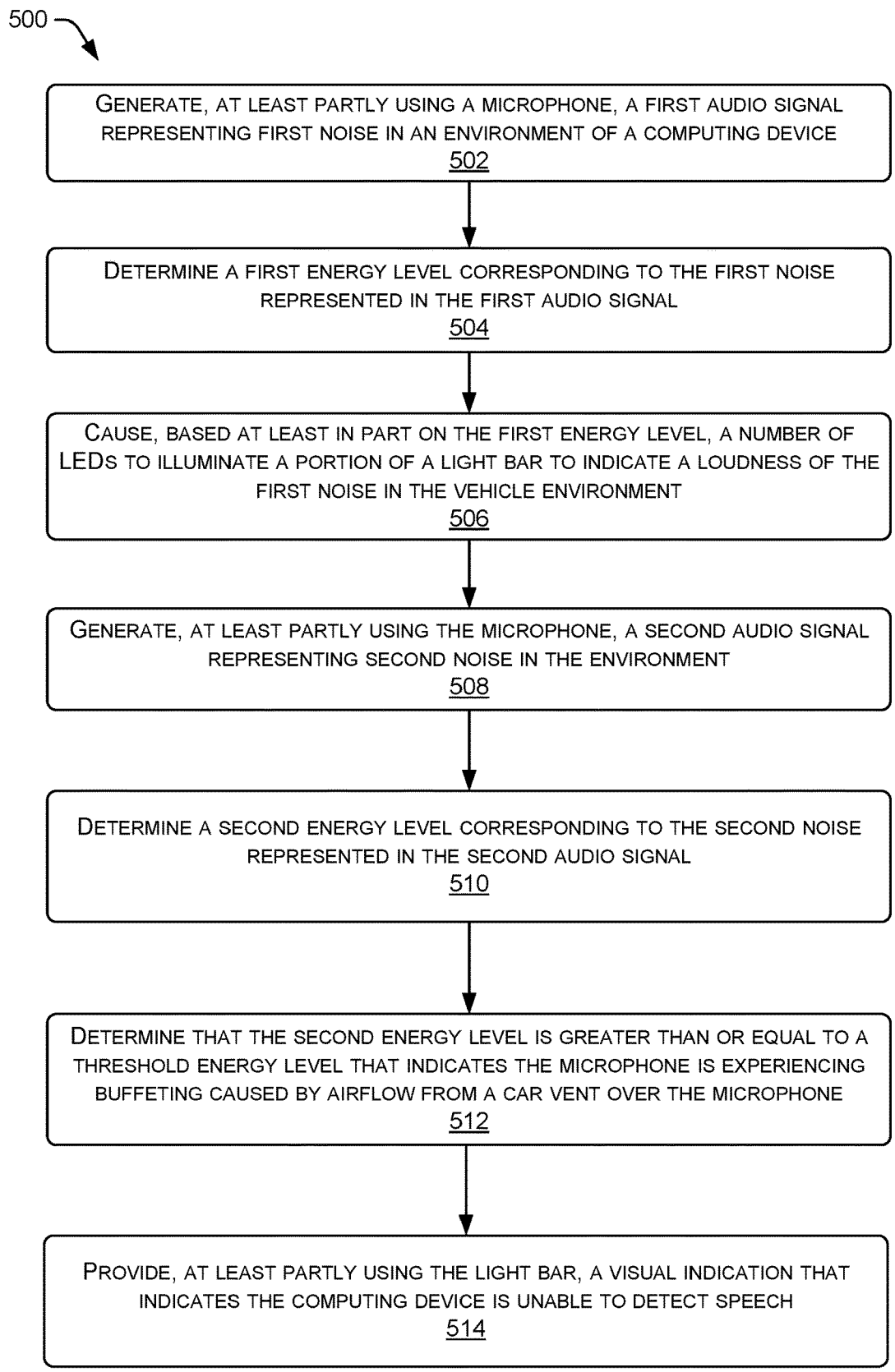
FIG. 5 illustrates a flow diagram of an example process for a voice-enabled device to detect noise levels at a microphone, indicate the noise levels, and indicate that the microphone is being buffeted.

FIG. 5 illustrates a flow diagram of an example process 500 for a voice-enabled device to detect noise levels at a microphone, indicate the noise levels, and indicate that the microphone is being buffeted. In some examples, the process 500 may be performed by a computing device.

At 502, a computing device may generate, at least partly using a microphone 204, a first audio signal representing first noise in an environment of the computing device. At 504, the computing device may determine a first energy level corresponding to the first noise represented in the first audio signal. At 506, the computing device may cause, based at least in part on the first energy level, one or more of the LEDs to illuminate a portion of the light bar to indicate a loudness at which speech is detected over the first noise by the computing device.

At 508, the computing device may generate, at least partly using the microphone, a second audio signal representing second noise in the environment. At 510, the computing device may determine a second energy level corresponding to the second noise represented in the second audio signal. At 512, the computing device may determine that the second energy level is greater than or equal to a threshold energy level that indicates the microphone is experiencing buffeting caused by airflow over the microphone. At 514, the computing device may cause, based at least in part on the second energy level being greater than or equal to the threshold energy level, each of the LEDs in the light bar to illuminate to indicate that the computing device is unable to detect speech due to the microphone experiencing buffeting.

Figure 6:
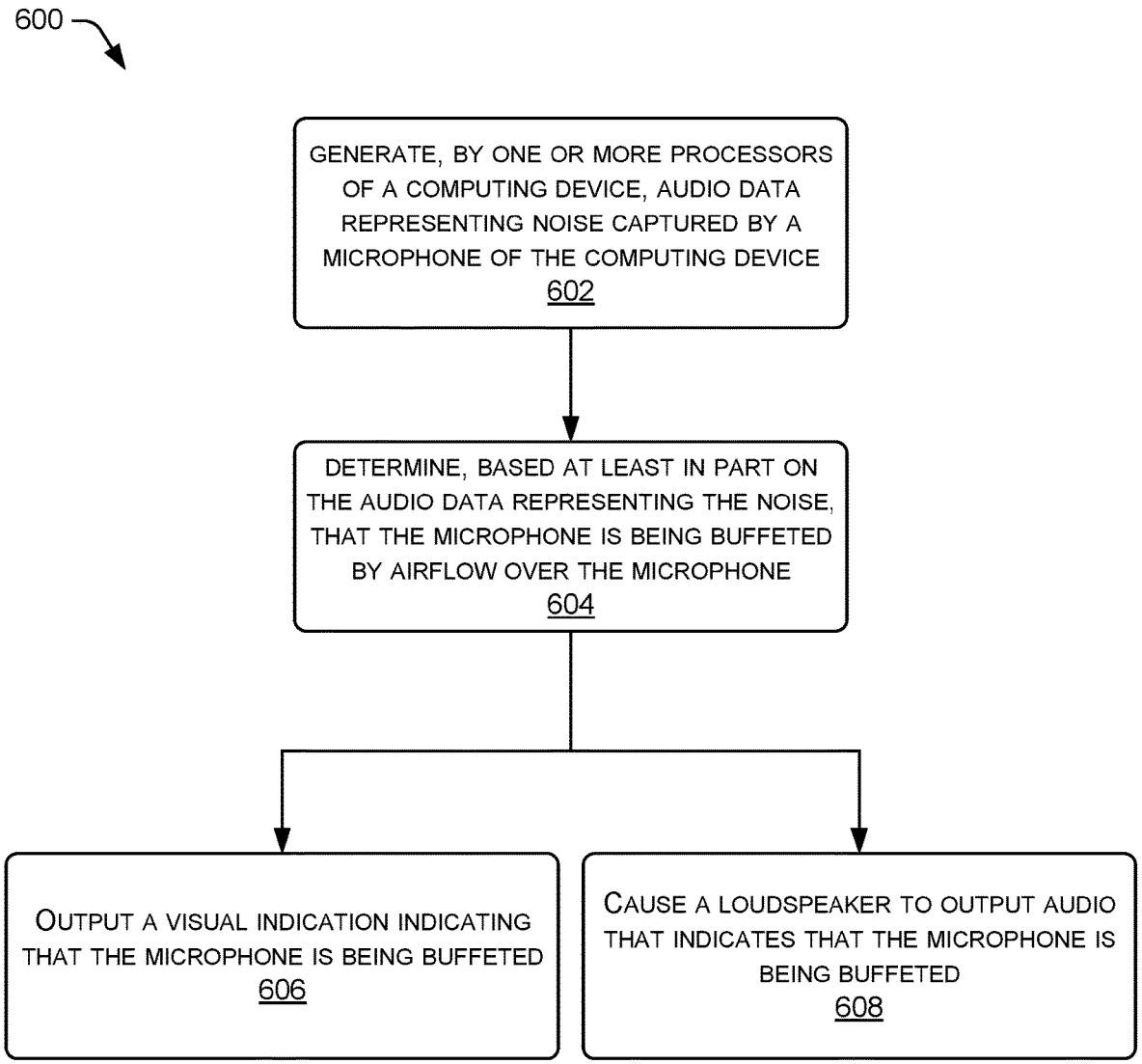
FIG. 6 illustrates a flow diagram of an example process for a voice-enabled device to detect noise levels at a microphone, determine that the microphone is being buffeted, and provide the user with a notification that the device is being buffeted.

FIG. 6 illustrates a flow diagram of an example process 600 for a voice-enabled device to detect noise levels at a microphone, determine that the microphone is being buffeted, and provide the user with a notification that the device is being buffeted.

At 602, a voice-enabled device 102 may generate, by one or more processors, audio data representing noise captured by a microphone 204. At 504, the voice-enabled device 102 may determine, based at least in part on the audio data representing the noise, that the microphone is being buffeted. At 506, the voice-enabled device 102 may, based at least in part on the microphone being buffeted, cause the loudspeaker to output audio that indicates that the microphone is being buffeted.

Figure 7A:
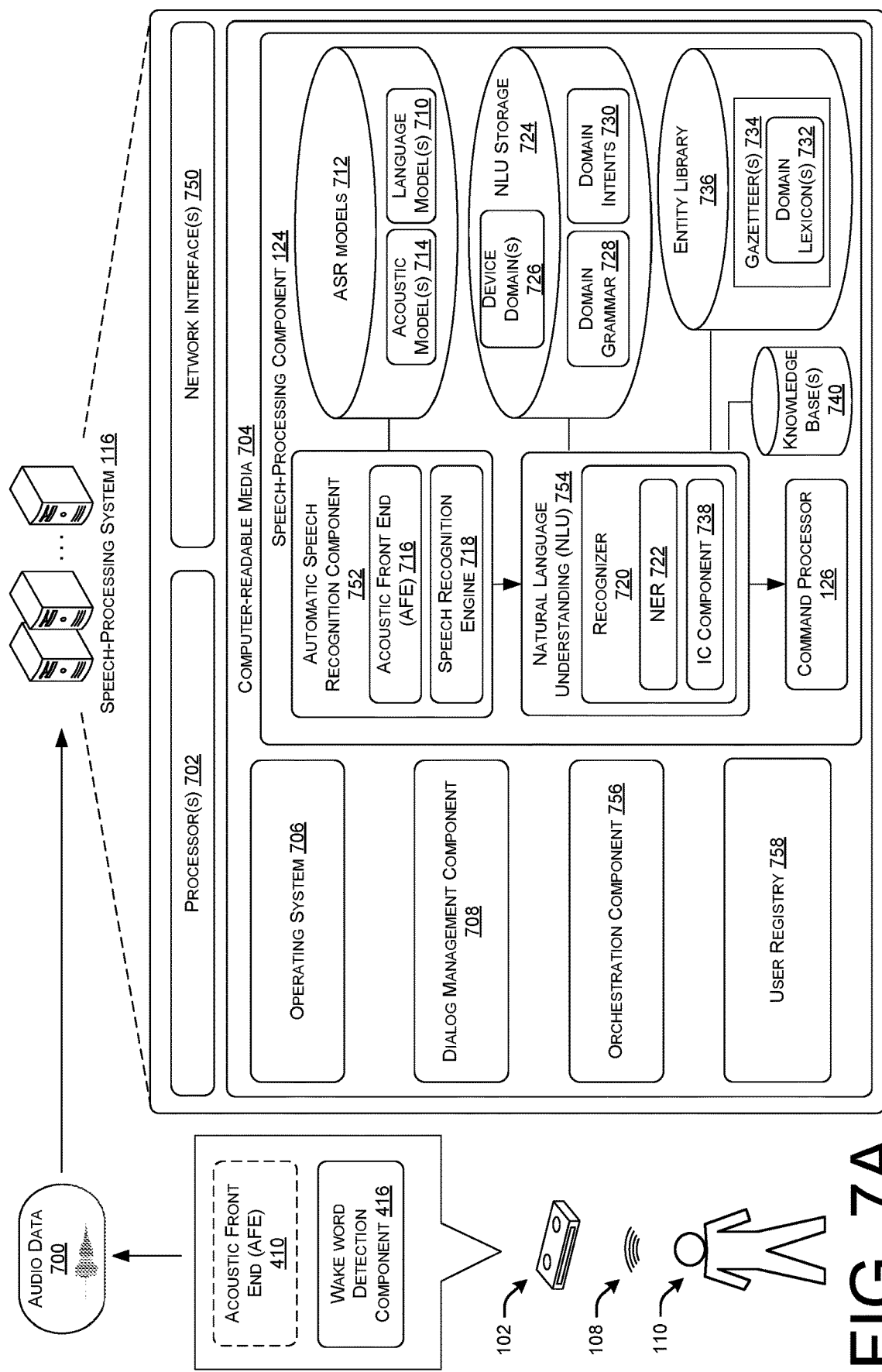
FIG. 7A illustrates a block diagram of an example architecture of a speech processing system which receives audio data from a voice-enabled device, and performs speech automatic speech recognition (ASR) and/or natural language understanding (NLU) techniques to determine an intent of the speech utterance.

FIG. 7A illustrates a block diagram of an example architecture of a speech processing system (e.g., speech-processing system 116) which receives audio data from a voice-enabled device, and performs speech automatic speech recognition (ASR) and/or natural language understanding (NLU) techniques to determine an intent of the speech utterance 108.

FIG. 7A includes a conceptual diagram of how a speech utterance 108 can be processed, allowing a system to capture and execute commands spoken by a user 110, such as spoken commands that may follow a wakeword. The various components illustrated may be located on a same or different physical devices. Communication between various components illustrated in FIG. 7A may occur directly or across a network. An audio capture component, such as a microphone 204 of voice-enabled device 102, captures audio corresponding to a speech utterance 108. The voice-enabled device 102, using a wakeword detection component 216, then processes the speech utterance 108, or audio data corresponding to the speech utterance 108, to determine if a keyword (such as a wakeword) is detected in the speech utterance 108. Following detection of a wakeword, the voice-enabled device 102 sends audio data 700 corresponding to the speech utterance 108, to a computing device of the speech-processing system 116 that includes an ASR component. The audio data 700 may be output from an acoustic front end (AFE) 214 located on the voice-enabled device 102 prior to transmission. Or, the audio data 700 may be in a different form for processing by a remote AFE 716, such as the AFE 214 located with the ASR component 752.

In various examples, the speech-processing system 116 may include one or more processors 702 to power components, devices, and actions of the speech-processing system 116, and one or more network interfaces 750 such as a wireless or Wi-Fi network communications interface, an Ethernet communications interface, a cellular network communications interface, a Bluetooth communications interface, etc., for communications by the speech-processing system 116 over various types of networks, including wide-area network, local-area networks, private networks, public networks etc. In the case of a wireless communications interfaces, such interfaces may include radio transceivers and associated control circuits and logic for implementing appropriate communication protocols.

The speech-processing system 116 may further include computer-readable media 704 which stores various components, components, or other executable software to perform various arbitration actions to determine which voice-enabled device is to respond to a command in the speech utterance 108. The computer-readable media may store an operating system 706 that is configured to manage hardware and services within and coupled to the speech-processing system 116.

The computer-readable media 702 may further store a dialog management component 708 that is responsible for conducting speech dialogs with the user 110 in response to meanings or intents of user speech determined by the NLU component 754. The dialog management component 708 may include domain logic that is used to analyze the meaning of user speech and to determine how to respond to the user speech. The dialog management component 708 may define rules and behaviors relating to different information or topic domains, such as news, traffic, weather, to-do lists, shopping lists, music, home automation, retail services, and so forth. The domain logic maps spoken user statements to respective domains and is responsible for determining dialog responses and/or actions to perform in response to user utterances.

The computer-readable media 702 may further include the user registry 758 including the device indications and topology indications. The speech-processing system 116 may further include various components for processing a speech utterance 108, such as automatic speech recognition component 752 and natural language understanding component 754. The various components illustrated may be located on a same or different physical devices.

In some examples, audio data 700 may be received by the speech-processing system 116 for speech processing for interpretation of the included speech utterance 108 (either for purposes of enabling voice-communications and/or for purposes of executing a command in the speech). The audio data may include data corresponding to the wakeword, or the portion of the audio data corresponding to the wakeword may be removed by the voice-enabled device 102 prior to sending. Upon receipt by the speech-processing system 116, the ASR component 752 may convert the audio data into text. The ASR component 752 transcribes audio data into text data representing the words of the speech contained in the audio data. The text data may then be used by other components for various purposes, such as arbitration, executing system commands, inputting data, etc. A speech utterance 108 in the audio data is input to a processor configured to perform ASR which then interprets the utterance based on the similarity between the utterance and pre-established ASR language models stored in an ASR model knowledge base (ASR Models Storage 712). For example, the ASR process may compare the input audio data with models for sounds (e.g., subword units or phonemes) and sequences of sounds to identify words that match the sequence of sounds spoken in the utterance of the audio data.

The different ways a speech utterance 108 may be interpreted (i.e., the different hypotheses) may each be assigned an ASR probability or an ASR confidence score representing the likelihood that a particular set of words matches those spoken in the utterance. The ASR confidence score may be based on a number of factors including, for example, the similarity of the sound in the utterance to models for language sounds (e.g., an acoustic model 714 stored in an ASR Models Storage 712), and the likelihood that a particular word which matches the sounds would be included in the sentence at the specific location (e.g., using a language or grammar model). Thus, each potential textual interpretation of the spoken utterance (hypothesis) is associated with an ASR confidence score. Based on the considered factors and the assigned ASR confidence score, the ASR component 752 outputs the most likely text recognized in the audio data. The ASR component 752 may also output multiple ASR hypotheses in the form of a lattice or an N-best list with each hypothesis corresponding to an ASR confidence score or other score (such as probability scores, etc.).

The device or devices performing the ASR processing may include an acoustic front end (AFE) 716 and a speech recognition engine 718. The acoustic front end (AFE) 716 transforms the audio data from the microphone into data for processing by the speech recognition engine 718. The speech recognition engine 718 compares the speech recognition data with acoustic models 714, language models 710, and other data models and information for recognizing the speech conveyed in the audio data. The AFE 716 may reduce noise in the audio data and divide the digitized audio data into frames representing time intervals for which the AFE 716 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE 716 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 718 may process the output from the AFE 716 with reference to information stored in speech/model storage (712). Alternatively, post front-end processed data (such as feature vectors) may be received by the device executing ASR processing from another source besides the internal AFE 716. For example, the voice-enabled device 102 may process audio data into feature vectors (for example using an on-device AFE 410)

and transmit that information to a server across a network for ASR processing. Feature vectors may arrive at the speech-processing system 116 encoded, in which case they may be decoded prior to processing by the processor executing the speech recognition engine 718.

The speech recognition engine 718 attempts to match received feature vectors to language phonemes and words as known in the stored acoustic models 714 and language models 710. The speech recognition engine 718 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 718 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 718 to other processing components, which may be local to the device performing ASR and/or distributed across the network(s). For example, ASR results in the form of a single textual representation of the speech, an N-best list including multiple hypotheses and respective scores, lattice, etc. may be sent to the speech-processing system 116, for natural language understanding (NLU) processing, such as conversion of the text into commands for execution, either by the user device, by the speech-processing system 116, or by another device (such as a server running a specific application like a search engine, etc.).

The NLU component 754 (e.g., server) may include various components, including potentially dedicated processor(s), memory, storage, etc. As shown in FIG. 7A, the NLU component 754 may include a recognizer 720 that includes a named entity recognition (NER) component 722 which is used to identify portions of query text that correspond to a named entity that may be recognizable by the system. A downstream process called named entity resolution links a text portion to a specific entity known to the system. To perform named entity resolution, the system may utilize gazetteer information 734 stored in entity library storage 736. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU component 754 takes textual input (such as the textual input determined by the ASR component 752) and attempts to make a semantic interpretation of the text. That is, the NLU component 754 determines the meaning behind the text based on the individual words and then implements that meaning. NLU component 754 interprets a text string to derive an intent or a desired action from the user as well as the pertinent pieces of information in the text that allow a device (e.g., voice-enabled device 102) to complete that action. For example, if a spoken utterance is processed using ASR component 752 and outputs the text "turn off the alarm" the NLU component 754 may determine that the user 110 intended that the voice-enabled device 102 be instructed to turn off an alarm sound being output. As another example, if the spoken utterance is processed using ASR component 752 and outputs the text "hang up the phone" the NLU component 754 may determine that the user 110 intended that the voice-enabled device 102 be instructed to hang up a phone through which a phone call is being performed.

The NLU component 754 may process several textual inputs related to the same utterance. For example, if the ASR component 752 outputs N text segments (as part of an N-best list), the NLU component 754 may process all N outputs to obtain NLU results.

To correctly perform NLU processing of speech input, the NLU component 754 may be configured to determine a "domain" of the utterance so as to determine and narrow down which services offered by the endpoint device (e.g., speech-processing system 116 or the voice-enabled device 102) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 722 receives a query in the form of ASR results and attempts to identify relevant grammars and lexical information that may be used to construe meaning. To do so, the NLU component 754 may begin by identifying potential domains that may relate to the received query. The NLU storage 724 includes a database of devices domains 726 which identify domains associated with specific devices. For example, the voice-enabled device 102 may be associated with domains for music, telephony, calendaring, contact lists, and device-specific communications, but not video. In addition, the device domains 726 may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 720, language model and/or grammar databases 728, a particular set of domain intents/actions 730, and a particular personalized domain lexicon 732. Each gazetteer 734 may include domain-indexed lexical information associated with a particular user and/or device. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) component 738 parses the query to determine an intent or intents for each identified domain, where the intent corresponds to the action to be performed that is responsive to the query. Each domain is associated with a database (e.g., domain intents 730) of words linked to intents. For example, a music domain intent database 730 may link words and phrases such as "quiet," "volume off," and "mute" to a "mute" intent. A voice-message domain intent database, meanwhile, may link words and phrases such as "send a message," "send a voice message," "send the following," or the like. The IC component 738 identifies potential intents for each identified domain by comparing words in the query to the words and phrases in the domain intents database 730. In some instances, the determination of an intent by the IC component 738 is performed using a set of rules or templates that are processed against the incoming text to identify a matching intent.

In order to generate a particular interpreted response, the NER 722 applies the grammar models and lexical information associated with the respective domain to actually recognize a mention one or more entities in the text of the query. In this manner, the NER component 722 identifies "slots" (i.e., particular words in query text) that may be needed for later command processing. Depending on the complexity of the NER component 722, it may also label each slot with a type of varying levels of specificity (such as noun, place, city, artist name, song name, or the like). Each grammar model 728 includes the names of entities (i.e., nouns) commonly found in speech about the particular domain (i.e., generic terms), whereas the lexical information 732 from the gazetteer 734 is personalized to the user(s) and/or the device. For instance, a grammar model associated with the shopping domain may include a database of words commonly used when people discuss shopping.

The intents identified by the IC component 738 are linked to domain-specific grammar frameworks (included in 730) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar (728) framework or frameworks may correspond to sentence structures such as "Send a message to {contact}," "Send a voice message to {contact}," "Send the following to {contact}," etc.

For example, the NER component 722 may parse the query to identify words as subject, object, verb, preposition, etc., based on grammar rules and/or models, prior to recognizing named entities. The identified verb may be used by the IC component 438 to identify intent, which is then used by the NER component 722 to identify frameworks. A framework for the intent of "send a message," meanwhile, may specify a list of slots/fields applicable to play the identified "contact" and any object modifier (e.g., specifying a device of the recipient) or the like. The NER component 722 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 722 may search the database of generic words associated with the domain (in the knowledge base 740). So, for instance, if the query was "send message to Joe," after failing to determine a last name for "Joe," the NER component 722 may search the domain vocabulary for the word "Joe." In the alternative, generic words may be checked before the gazetteer information, or both may be tried, potentially producing two different results.

The output data from the NLU component 754 (which may include tagged text, commands, etc.) may then be sent to the command processor 126. The destination command processor 126 may be determined based on the NLU output. For example, if the NLU output includes a command to send a message, the destination command processor 126 may be a message sending application, such as one located on the user device or in a message sending appliance, configured to execute a message sending command. If the NLU output includes a search request, the destination command processor 126 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 754 during runtime operations where NLU operations are performed on text (such as text output from an ASR component 752). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 720. Each recognizer may include various NLU components such as an NER component 722, IC component 738 and other components such as an entity resolver, or other components.

As noted above, multiple devices may be employed in a single speech-processing system 116. In such a multi-device system, each of the devices may include different components for performing different aspects of the speech processing. The multiple devices may include overlapping components. The components of the voice-enabled device 102 and the speech-processing system 116, as illustrated herein are exemplary, and may be located in a stand-alone device or may be included, in whole or in part, as a component of a larger device or system, may be distributed across a network or multiple devices connected by a network, etc.

Figure 7B:
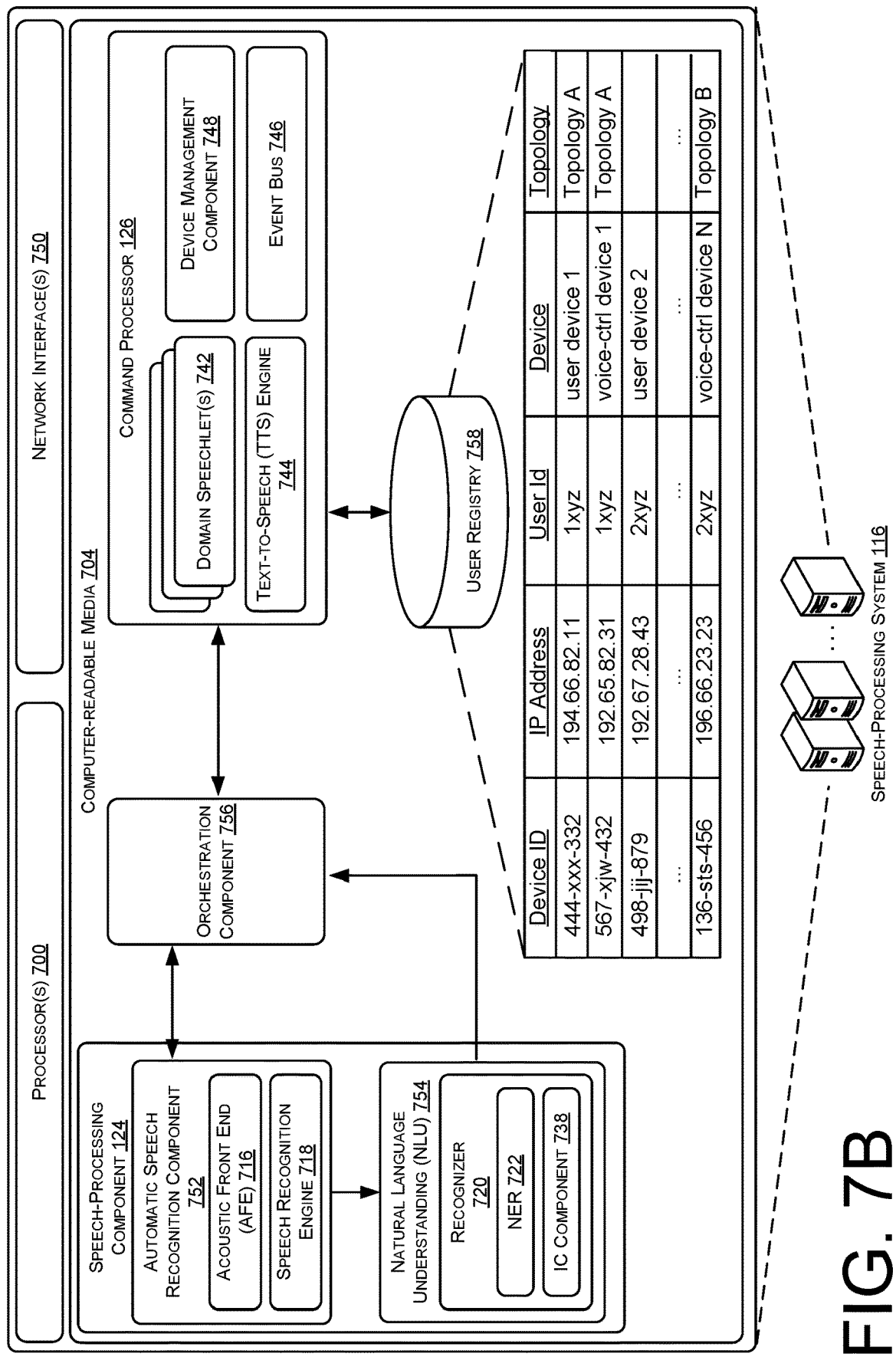
FIG. 7B illustrates a block diagram of an example architecture of a speech processing system including a command processor configured to generate a command and/or additional content that is responsive to an intent of the speech utterance.

FIG. 7B illustrates a block diagram of an example architecture of a speech processing system (e.g., speech-processing system 116) including a command processor 126 configured to generate a command and/or additional content that is responsive to an intent of the speech utterance 108.

FIG. 7B illustrates a block diagram of an example architecture of the speech-processing system 116 including the command processor 126 configured to generate a command that the selected voice-enabled device 102 uses to respond to the speech utterance 108. As illustrated in FIG. 7B, the speech-processing system 116, including the orchestration component 756 and a speech processing component 128 comprising the ASR component 752 and the NLU component 754, may be coupled to the command processor 126.

The command processor 126 and/or NLU component 754 may determine a domain based on the intent and, based on this determination, route the request corresponding to the audio data to the appropriate domain speechlet, such as the illustrated domain speechlets 742. The domain speechlet 742 may comprise any type of device or group of devices (e.g., hardware device, virtual devices or partitions, server, etc.), and may receive the text data and/or an intent associated with the audio data 700 and determines how to respond to the request. For instance, the intent for a command "please hang up my phone call" may be routed to a smart phone domain speechlet 742 which controls devices connected to the voice-enabled device 102, such as a phone 108 through which a phone call is being conducted. The smart phone domain speechlet 742 may determine a command to generate based on the intent of the user 110 to hang up a phone call. Additionally, the smart phone domain speechlet 742 may determine additional content, such as TTS response audio data, to be output by the vehicle computing device 122 and/or the voice-enabled device 102, such as "we have hung up your phone call."

Various types of domain speechlets 742 may be used to determine how the devices 102, 120, and/or 122 are to respond to the speech utterance 108, as well as the appropriate response and potential additional content (e.g., TTS response audio data, earcon audio data, etc.). For example, the domain speechlets 742 may include a third party skills domain speechlet 742 which may handle intents associated with gaming, productivity, etc., a music domain speechlet 742 which may handle intents associated with music play requests (e.g., Amazon Music, Pandora, Spotify, iHeart, etc.), a video domain speechlet 742 which may handle intents associated with video play requests (e.g., Amazon Video, HBO, Netflix, Hulu, etc.), a household organization domain speechlet 742 which may handle intents associated with household activities (e.g., calendars, reminders, timers, etc.), a smart device domain speechlet 742 which may handle intents associated with controlling smart devices (e.g., controlling lights, door locks, vehicle monitoring, etc.), an automotive domain speechlet 742, a shopping domain speechlet 742 which may handle shopping requests (e.g., making a shopping list, ordering items online, etc.), and/or a weather domain speechlet 742 which may handle requests for weather forecasts (e.g., providing a URL to a weather website, providing weather related images and/or videos, etc.).

After the domain speechlet 742 generates the appropriate command based on the intent of the user 110, and/or provides additional content, such as audio data, to be output by one of the voice-enabled device 102, user device 120, and/or vehicle computing device 122 (e.g., "we have hung up your phone call"), the domain speechlet 742 may provide this information back to the command processor 126, which in turns provides some or all of this information to a text-to-speech (TTS) engine 744. The TTS engine 744 then generates an actual audio file for outputting the second audio data determined by the domain speechlet 742 (e.g., "we have hung up your phone call", or "we have turned off your alarm . . . "). After generating the file (or "audio data"), the TTS engine 744 may provide this data back to the speech-processing system 116.

The speech-processing system 116 may then publish (i.e., write) some or all of this information to an event bus 746. That is, the speech-processing system 116 may provide information regarding the initial request (e.g., the speech, the text, the domain/intent, etc.), the response to be provided to the voice-enabled device 102, user device 120, and/or vehicle computing device 122 (e.g., the command to hang up a phone call, the command to turn off an alarm, etc.), or any other information pertinent to the interaction between the user device 120 and the speech-processing system 116 to the event bus 746.

Within the speech-processing system 116, one or more components or services may subscribe to the event bus 746 so as to receive information regarding interactions between user devices and the speech-processing system 116. In the illustrated example, for instance, the device management component 748 may subscribe to the event bus 446 and, thus, may monitor information regarding these interactions. In some examples, monitoring information in the event bus 746 may comprise communications between various components of the speech-processing system 116. In some examples, the event bus 746 may "push" or send indications of events and/or device state data to the different components. Additionally, or alternatively, the event bus 746 may be "pulled" where the command processor 126 sends requests to the event bus 746. The event bus 746 may store indications of the device states for the devices 106, 120, and/or 122 such as in a database (e.g., user registry 758).

The device management component 748 functions to monitor information published to the event bus 746 and identify events that may trigger action. For instance, the device management component 748 may identify (e.g., via filtering) those events that result in an action to be taken, such as streaming music audio data or performing a call. The device management component 748 may determine whether a particular event identified is associated with supplemental content. That is, the device management component 748 may write, to a datastore, indications of which types of events and/or which primary content or responses are associated with supplemental content (e.g., TTS response audio data, earcon audio data, etc.). In some instances, the speech-processing system 116 may provide access to third-party developers to allow the developers to register supplemental content for output on secondary devices for particular events and/or primary content. For example, if a device 106, 120, and/or 122 is to output that the weather will include thunder and lightning, the device management component 748 may store an indication of supplemental content such as thunder sounds, pictures/animations of lightning and the like.

Finally, the device management component 748 may determine how to transmit response and/or supplement content (and/or information acquiring the content) to the user device 120 and/or the voice-enabled device 102. To make this determination, the device management component 748 may determine a device type of the devices 108 and/or 106, capabilities of the device(s), or the like, potentially as stored in the user registry 758. In some instances, the device management component 748 may determine that a particular device 108 is able to communicate directly with the speech-processing system 116 (e.g., over WiFi) and, thus, the device management component 748 may provide the response and/or content directly over a network to the device 108.

The computer-readable media 702 may further include the user registry 758 that includes data regarding user profiles as described herein. The user registry 758 may be located part of, or proximate to, the speech-processing system 116, or may otherwise be in communication with various components, for example over a network. The user registry 758 may include a variety of information related to individual users, accounts, etc. that interact with the voice-enabled devices 106, and the speech-processing system 116. For illustration, the user registry 758 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device.

As used herein, a processor, such as processor(s) 202 and/or 702, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 202 and/or 702 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 202 and/or 702 may possess its own local memory, which also may store program components, program data, and/or one or more operating systems.

As described herein, computer-readable media 210 and/or 704 may include volatile and nonvolatile memory, removable and non-removable media implemented in any method or technology for storage of information, such as computer-readable instructions, data structures, program component, or other data. Such computer-readable media 210 and/or 704 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 202 and/or 702 to execute instructions stored on the computer-readable media 210 and/or 704. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 210 and/or 704, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computing device comprising:
   a microphone;
   a loudspeaker;
   a light bar comprising light emitting diodes (LEDs);
   one or more processors; and
   computer-readable media storing computer-executable instructions that, when executed by the one or more processors, cause the one or more processors to perform operations comprising:
     generating, at least partly using the microphone and at a first time, a first audio signal representing first noise in a vehicle environment in which the computing device is located;
     determining a first energy level corresponding to the first noise represented in the first audio signal;
     calculating, at least partly using a linear mapping and the first energy level, a number of the LEDs to illuminate;
     causing the number of the LEDs to illuminate a portion of the light bar to indicate a loudness of the first noise in the vehicle environment;
     generating, at least partly using the microphone and at a second time subsequent the first time, a second audio signal representing second noise in the vehicle environment;
     determining a second energy level corresponding to the second noise represented in the second audio signal;

determining that the second energy level is greater than or equal to a threshold energy level that indicates the microphone is experiencing buffeting caused by airflow from a car vent over the microphone;
    based at least in part on the microphone being buffeted:
        providing, at least partly using the light bar, a visual indication that indicates the computing device is unable to detect speech; and
        causing the loudspeaker to output an audio indication that indicates that the microphone is being buffeted.

2. The computing device of claim 1, the operations further comprising:
    converting the second audio signal to a sequence of samples representing the second noise for a period of time;
    determining energy levels corresponding to individual ones of the sequence of the samples; and
    determining that more than a threshold number of the energy levels are greater than or equal to the threshold energy level,
    wherein providing the visual indication is performed based at least in part on more than the threshold number of the energy levels being greater than or equal to the threshold energy level.

3. The computing device of claim 1, further comprising a microphone array including the microphone and a second microphone, and wherein providing the visual indication further comprises:
    generating, at least partly using the second microphone, a third audio signal representing the second noise in the environment;
    determining a third energy level corresponding to the second noise represented in the third audio signal; and
    determining that the third energy level is greater than or equal to the threshold energy level that indicates the second microphone is experiencing buffeting.

4. The computing device of claim 1, wherein the audio indication comprises one or more machine-generated words that request the computing device be moved to a different location in the vehicle environment.

5. A method comprising:
    generating, by one or more processors of a computing device, first audio data representing noise captured by a first microphone of the computing device;
    determining, by the computing device, based at least in part on the first audio data representing the noise, that the first microphone is being buffeted by airflow over the first microphone;
    outputting, by the computing device, a visual indication indicating that the first microphone is being buffeted;
    generating second audio data representing the noise captured by a second microphone of the computing device;
    determining that the second audio data represents an utterance; and
    based at least in part on the second audio data representing the utterance, sending the second audio data to another computing device.

6. The method of claim 5, wherein the first audio data represents the noise over a period of time, further comprising:
    determining energy levels corresponding to the noise represented in the first audio data over the period of time;
    determining that more than a threshold number of the energy levels are greater than or equal to a threshold energy level that indicates the first microphone is being buffeted.

7. The method of claim 5, further comprising outputting, by the computing device, an auditory indication indicating that the first microphone is being buffeted.

8. The method of claim 5, further comprising:
    determining an energy level corresponding to the noise represented in the first audio data;
    determining that the energy level is greater than or equal to a threshold energy level that indicates the first microphone is being buffeted by the airflow,
    wherein determining that the first microphone is being buffeted by the airflow is based at least in part on the energy level being greater than or equal to the threshold energy level.

9. The method of claim 5, further comprising:
    prior to generating the audio data, causing a loudspeaker associated with the computing device to output first audio requesting that computing device be placed near the airflow; and
    subsequent to determining that the microphone is being buffeted by the airflow, causing the loudspeaker to output second audio indicating that the microphone is being buffeted.

10. The method of claim 5, wherein:
    the first audio data represents first noise;
    the computing device includes a light bar of light emitting diodes (LEDs); and
    further comprising, prior to generating the first audio data:
        generating, by the one or more processors of the computing device, third audio data representing second noise captured by the first microphone;
        determining an energy level corresponding to the second noise represented in the second audio data;
        determining, at least partly using a linear mapping and the energy level, a number of the LEDs to illuminate to indicate a loudness of the second noise; and
        causing the number of the LEDs to illuminate a portion of the light bar such that the portion of the light bar that is illuminated indicates the loudness of the second noise.

11. A computing device comprising:
    a microphone;
    a loudspeaker;
    one or more processors;
    computer-readable media storing computer-executable instructions that, when executed by the one or more processors, cause the one or more processors to perform operations comprising:
        generating, by the one or more processors, first audio data representing first noise captured by the microphone;
        determining an energy level corresponding to a loudness of the first noise represented in the first audio, the energy level being less than a threshold energy level associated with the microphone being buffeted;
        outputting, by the computing device, a visual indication indicating the loudness of the first noise;
        generating, by the one or more processors, second audio data representing second noise captured by the microphone;
        determining, based at least in part on the second audio data, that the microphone is being buffeted;
        based at least in part on determining that the microphone is being buffeted:

ceasing to output the visual indication;
causing the loudspeaker to output audio that indicates that the microphone is being buffeted.

12. The computing device of claim 11, wherein the audio that indicates that the microphone is being buffeted comprises one or more machine-generated words that indicate that the microphone is being buffeted.

13. The computing device of claim 11, further comprising a light source, the operations further comprising:
based at least in part on the microphone being buffeted, causing the light source to output another visual indication indicating that the microphone is being buffeted.

14. The computing device of claim 11, wherein the second audio data represents the second noise over a period of time, the operations further comprising:
determining energy levels corresponding to the second noise represented in the second audio data over the period of time;
determining that more than a threshold number of the energy levels are greater than or equal to a threshold energy level that indicates the microphone is being buffeted.

15. The computing device of claim 11, the operations further comprising:
determining another energy level corresponding to the second noise represented in the second audio data;
determining that the other energy level is greater than or equal to the threshold energy level that indicates the microphone is being buffeted,
wherein the determining that the microphone is being buffeted is based at least in part on the other energy level being greater than or equal to the threshold energy level.

16. The computing device of claim 11, wherein the microphone comprises a first microphone the operations further comprising:
generating third audio data representing the first noise captured by a second microphone of the computing device;
determining that the third audio data represents an utterance; and
based at least in part on the third audio data representing the utterance, sending the third audio data to another computing device.

17. The computing device of claim 11, wherein:
the microphone comprises a first microphone included in a microphone array of the computing device; and
wherein causing the loudspeaker to output audio further comprises:
generating, by the one or more processors, third audio data representing third noise captured by a second microphone of the microphone array; and
determining, based at least in part on the third audio data representing the third noise, that the second microphone is being buffeted.

18. The computing device of claim 11, the operations further comprising:
prior to generating the audio data, causing the loudspeaker to output first audio requesting that computing device be placed near airflow; and
subsequent to determining that the microphone is being buffeted by the airflow, causing the loudspeaker to output second audio indicating that the microphone is being buffeted.

19. The computing device of claim 11, further comprising a light bar of light emitting diodes (LEDs), and the operations further comprising, prior to generating the first audio data:
generating, by the one or more processors of the computing device, third audio data representing third noise captured by the microphone of the computing device;
determining an energy level corresponding to the third noise represented in the third audio data; and
determining, at least partly using a linear mapping and the energy level, a number of the LEDs to illuminate to indicate a loudness of the third noise; and
causing the number of the LEDs to illuminate a portion of the light bar such that the portion of the light bar that is illuminated indicates the loudness of the third noise.

\* \* \* \* \*